United States Patent
Kanno et al.

(10) Patent No.: US 11,042,305 B2
(45) Date of Patent: Jun. 22, 2021

(54) MEMORY SYSTEM AND METHOD FOR CONTROLLING NONVOLATILE MEMORY

(71) Applicant: Toshiba Memory Corporation, Tokyo (JP)

(72) Inventors: Shinichi Kanno, Tokyo (JP); Hideki Yoshida, Yokohama Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 16/004,509

(22) Filed: Jun. 11, 2018

(65) Prior Publication Data

US 2019/0138226 A1    May 9, 2019

(30) Foreign Application Priority Data

Nov. 6, 2017    (JP) .............................. JP2017-213955

(51) Int. Cl.
  *G06F 12/02*    (2006.01)
  *G06F 3/06*    (2006.01)
  *G06F 12/16*    (2006.01)

(52) U.S. Cl.
  CPC ............ *G06F 3/0616* (2013.01); *G06F 3/064* (2013.01); *G06F 3/0659* (2013.01); *G06F 3/0679* (2013.01); *G06F 12/16* (2013.01)

(58) Field of Classification Search
  None
  See application file for complete search history.

(56) References Cited

U.S. PATENT DOCUMENTS

| | | | |
|---|---|---|---|
| 8,806,111 B2 | 8/2014 | Whitney | |
| 9,263,136 B1 | 2/2016 | Zhao et al. | |
| 2009/0256795 A1 | 10/2009 | Naum et al. | |
| 2010/0011260 A1 | 1/2010 | Nagadomi et al. | |
| 2010/0023675 A1* | 1/2010 | Chen | G06F 12/0246 711/103 |
| 2010/0050053 A1* | 2/2010 | Wilson | G06F 11/1068 714/773 |
| 2011/0078402 A1 | 3/2011 | Sato | |
| 2012/0191900 A1* | 7/2012 | Kunimatsu | G06F 3/0631 711/103 |
| 2012/0198196 A1* | 8/2012 | Song | G06F 12/0246 711/170 |
| 2012/0203951 A1* | 8/2012 | Wood | G11C 16/28 711/102 |

(Continued)

FOREIGN PATENT DOCUMENTS

CN    103678150 A    3/2014
JP    2011-70346 A    4/2011

(Continued)

*Primary Examiner* — Ryan Bertram
*Assistant Examiner* — Trang K Ta
(74) *Attorney, Agent, or Firm* — White & Case LLP

(57) ABSTRACT

According to one embodiment, a memory system manages wear of each of a plurality of blocks in a nonvolatile memory. The memory system receives, from a host, a write request including a parameter specifying a data retention term required for first data to be written. The memory system selects, from the blocks, a first block in which a data retention term estimated from the wear of the first block is longer than or equal to the specified data retention term. The memory system writes the first data to the first block.

20 Claims, 30 Drawing Sheets

(56) References Cited

U.S. PATENT DOCUMENTS

| | | | |
|---|---|---|---|
| 2013/0073785 A1* | 3/2013 | Emma | G06F 12/0238 |
| | | | 711/103 |
| 2013/0262751 A1* | 10/2013 | Kwak | G11C 16/3495 |
| | | | 711/103 |
| 2014/0122774 A1* | 5/2014 | Xian | G06F 12/0246 |
| | | | 711/103 |
| 2014/0181376 A1* | 6/2014 | Miyamoto | G06F 12/0246 |
| | | | 711/103 |
| 2015/0186072 A1* | 7/2015 | Darragh | G06F 3/0653 |
| | | | 711/103 |
| 2016/0062992 A1 | 3/2016 | Chen et al. | |
| 2016/0299805 A1 | 10/2016 | Zhou | |

FOREIGN PATENT DOCUMENTS

| | | |
|---|---|---|
| TW | 200834181 A | 8/2008 |
| TW | 200834581 A | 8/2008 |

* cited by examiner

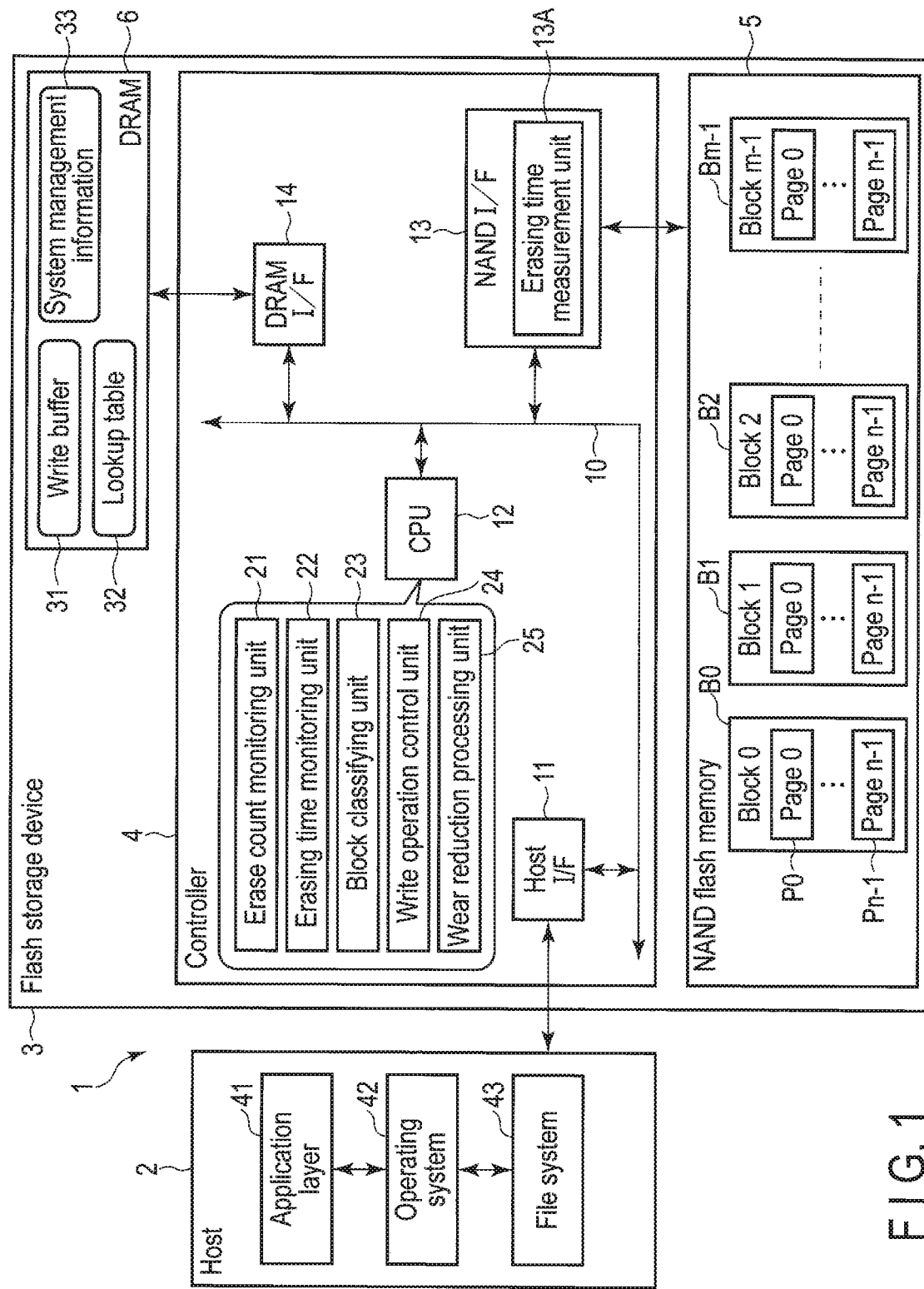
F I G. 1

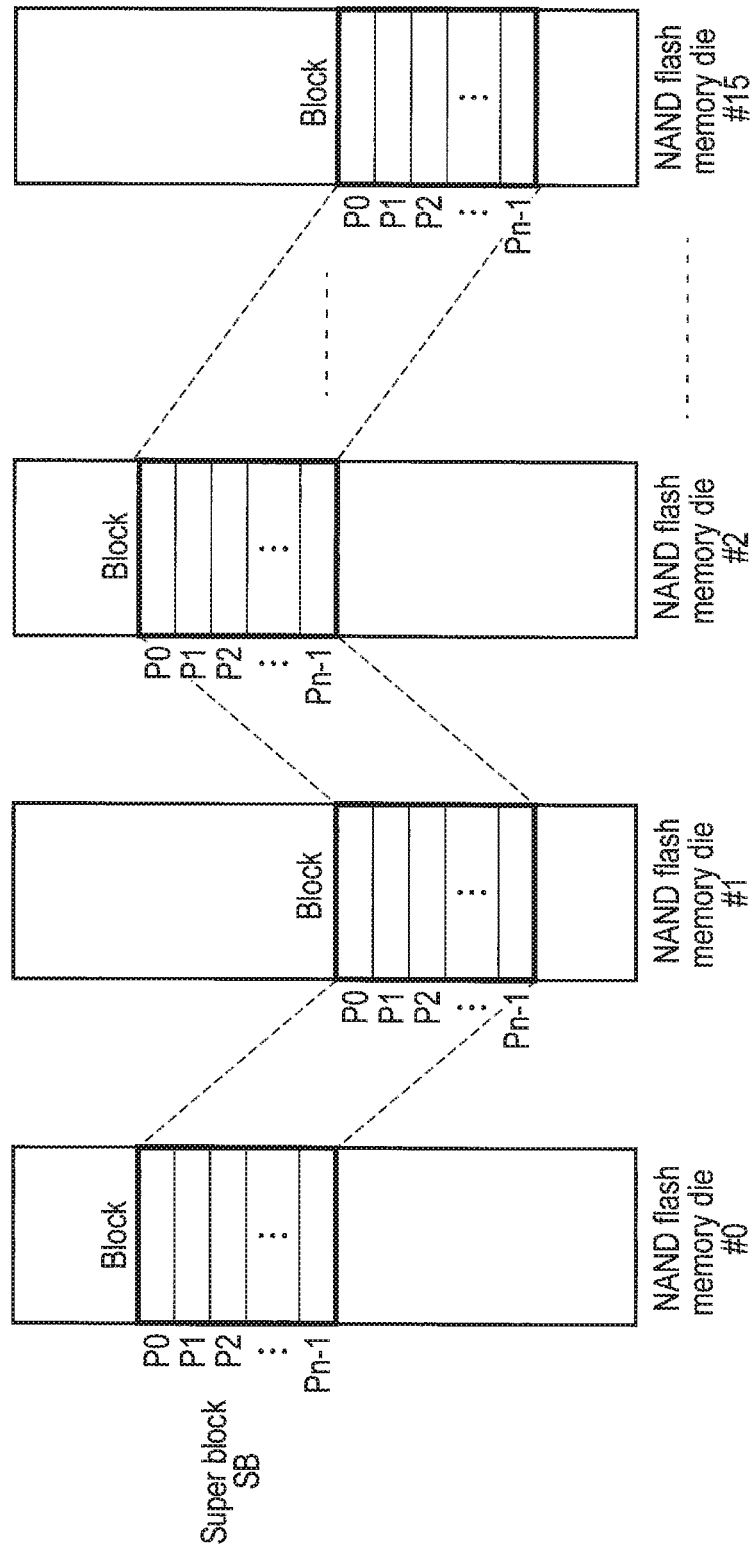
F I G. 3

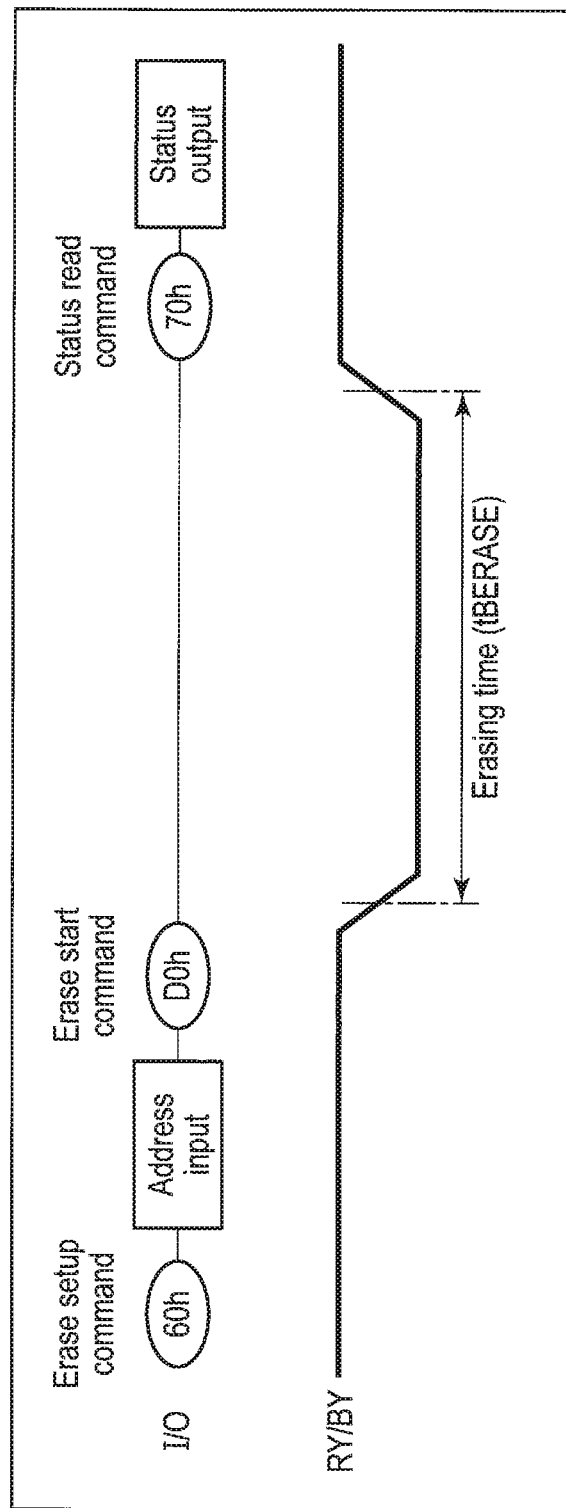
F I G. 4

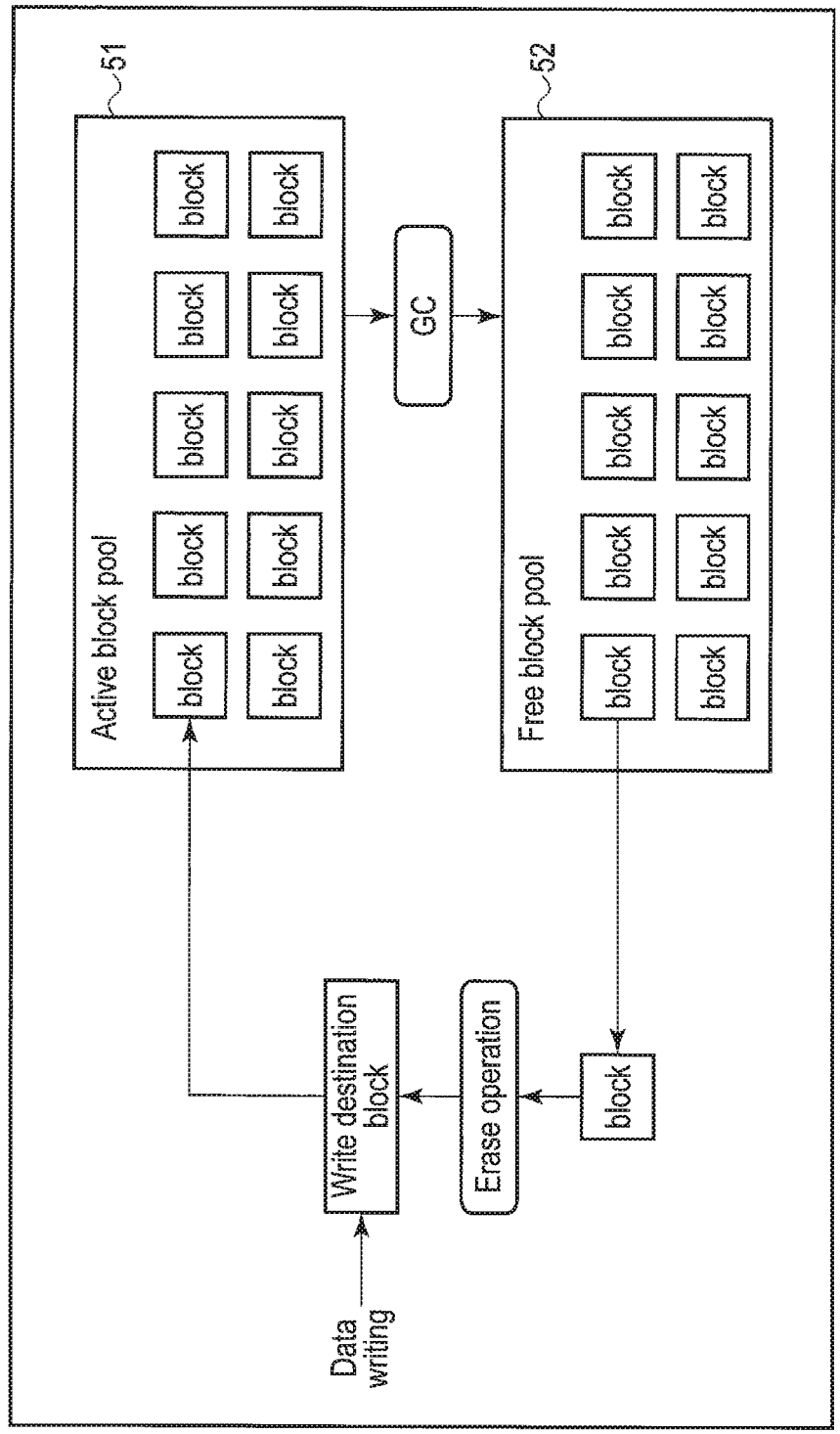
F I G. 5

Block wear management table

| Wear | Block address | Estimated data retention term |
|---|---|---|
| Level 1 (Erase count 0~500) | #10, #11, #23, #30, ····· | 10 years |
| Level 2 (Erase count 500~1000) | #9, #16, #22, #29, ····· | 5 years |
| Level 3 (Erase count 1000~1500) | #7, #8, #21, #28, ····· | 1 year |
| Level 4 (Erase count 1500~2000) | #5, #6, #20, #27, ····· | 8 months |
| Level 5 (Erase count 2000~2500) | #4, #15, #19, #26, ····· | 6 months |
| Level 6 (Erase count 2500~3000) | #3, #14, #18, #25, ····· | 4 months |
| Level 7 (Erase count 3000~3500) | #2, #13, #17, #24, ····· | 2 months |
| ... | ... | ... |
| Level 10 (Erase count 9500~10000) | #1, #12, ····· | 1 week |

Wear: Small ←——————→ Large

F I G. 6

Block wear management table 33A'

| Wear | Block address | Estimated data retention term |
|---|---|---|
| Level 1 (Erasing time t1~t2 sec) | #10, #11, #23, #30, ..... | 10 years |
| Level 2 (Erasing time t2~t3 sec) | #9, #16, #22, #29, ..... | 5 years |
| Level 3 (Erasing time t3~t4 sec) | #7, #8, #21, #28, ..... | 1 year |
| Level 4 (Erasing time t4~t5 sec) | #5, #6, #20, #27, ..... | 8 months |
| Level 5 (Erasing time t5~t6 sec) | #4, #15, #19, #26, ..... | 6 months |
| Level 6 (Erasing time t6~t7 sec) | #3, #14, #18, #25, ..... | 4 months |
| Level 7 (Erasing time t7~t8 sec) | #2, #13, #17, #24, ..... | 2 months |
| ... | ... | ... |
| Level 10 (Erasing time t10~t11 sec) | #1, #12, ..... | 1 week |

Wear: Small ← → Large t1 < t2 < t3 < t4 < t5 < t6 < t7 < t8 < --- < t10 < t11

F I G. 7

Write command

| Parameter | Description |
|---|---|
| Starting LBA | First LBA of data to be written |
| Length (the number of logical blocks) | Length of data to be written (the number of logical blocks corresponding to data to be written) |
| Required-data-retention term | Data retention term required for data to be written (1 week, 2 weeks, 1 month, 2 months, 4 months, 6 months, 8 months, 1 year, 5 years or 10 years, etc.) |

F I G. 8

| Wear = level 1 (Data retention term: 10 years) | Wear = level 2 (Data retention term: 5 years) | Wear = level 3 (Data retention term: 1 year) | Wear = level 4 (Data retention term: 8 months) | Wear = level 5 (Data retention term: 6 months) | Wear = level 6 (Data retention term: 4 months) | Wear = level 7 (Data retention term: 2 months) | Wear = level 8 (Data retention term: 1 month) | Wear = level 9 (Data retention term: 2 weeks) | Wear = level 10 (Data retention term: 1 week) |
|---|---|---|---|---|---|---|---|---|---|
| block 301 | block 304 | block 308 | block 312 | block 316 | block 319 | block 323 | block 327 | block 330 | block 333 |
| block 302 | block 305 | block 309 | block 313 | block 317 | block 320 | block 324 | block 328 | block 331 | block 334 |
| block 303 | block 306 | block 310 | block 314 | block 318 | block 321 | block 325 | block 329 | block 332 | block 335 |
|  | block 307 | block 311 | block 315 |  | block 322 | block 326 |  |  |  |

Wear: Small ↔ Large

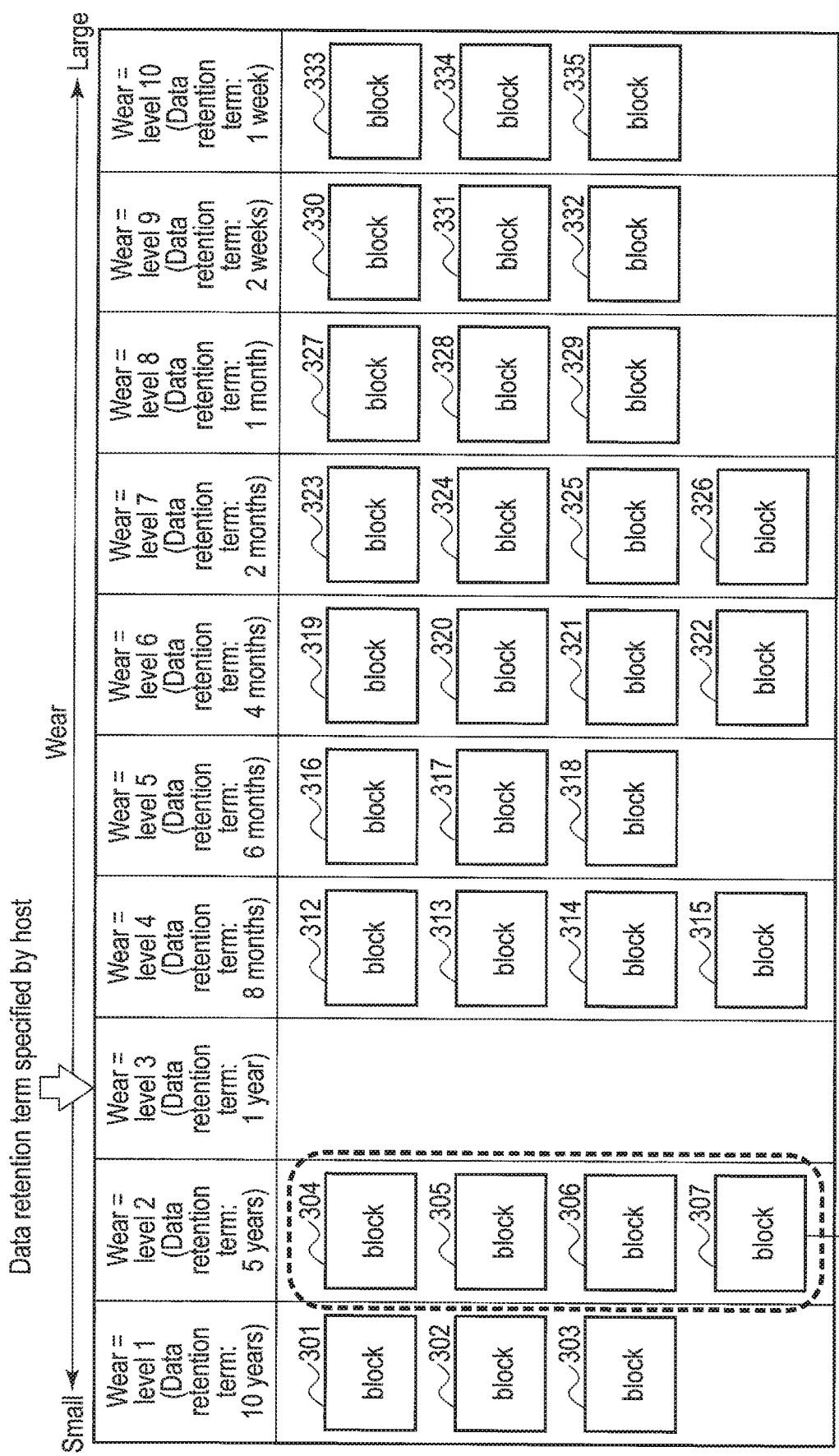
F I G. 14

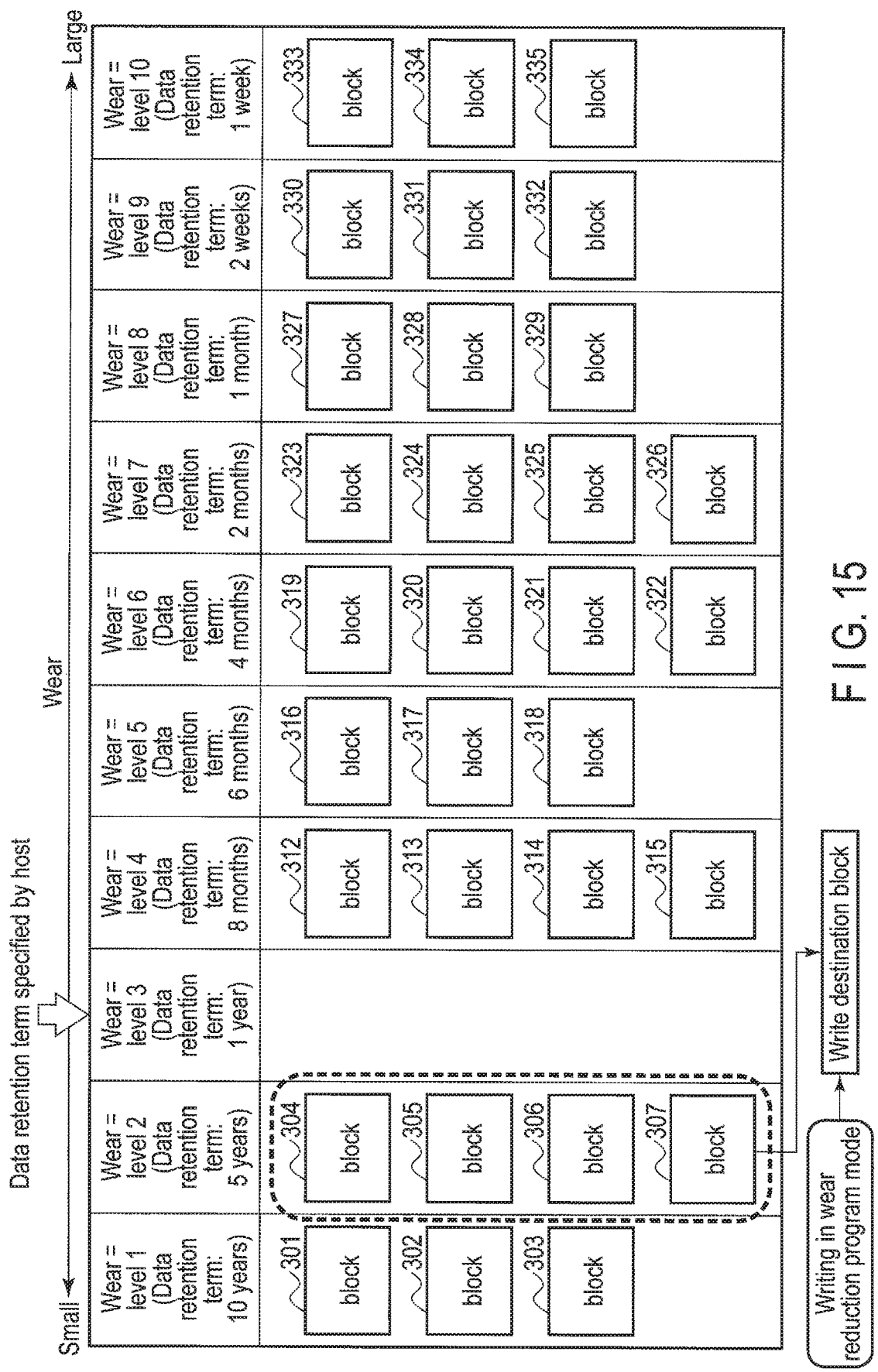
F I G. 15

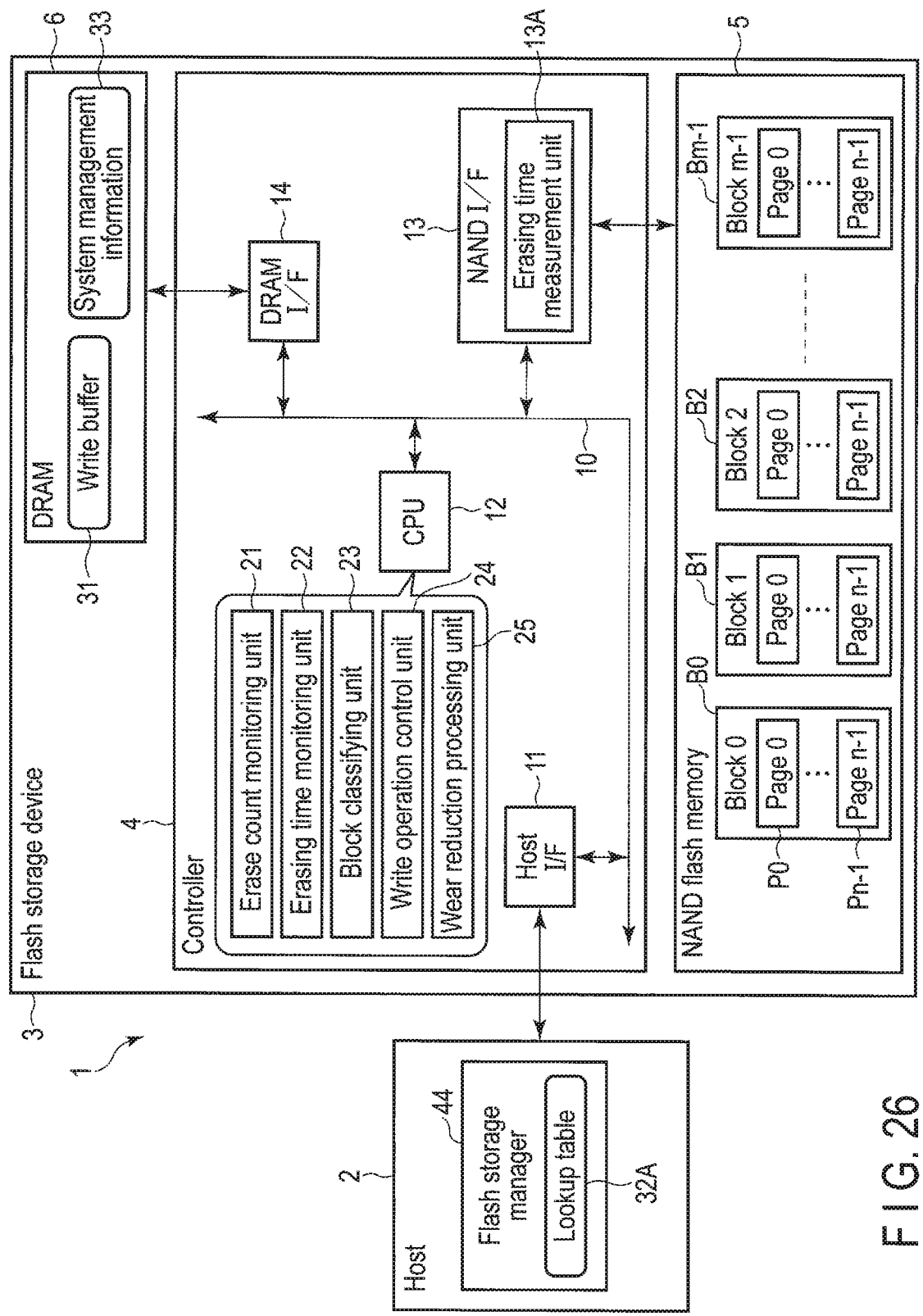
F I G. 26

Write command

| Parameter | Description |
|---|---|
| QoS domain ID | Identifier for uniquely identifying QoS domain to which data should be written |
| Logical address | Logical address is tag for identifying data to be written (for example, LBA, key or file identifier) |
| Length | Length of data to be written |
| Required-data-retention term | Data retention term required for data to be written (for example, 1 week, 2 weeks, 1 month, 2 months, 4 months, 6 months, 8 months, 1 year, 5 years or 10 years) |

F I G. 27

Response to write command

| Parameter | Description |
|---|---|
| Logical address | Logical address which was included in write command |
| Physical address | Physical address indicates physical storage location to which data is written |
| Length | Length of written data |

F I G. 28

Trim command

| Parameter | Description |
|---|---|
| Physical address | Physical address indicates first physical storage location in which data to be invalidated (data whose reference count should be reduced) is stored |
| Length | Length of data to be invalidated (data whose reference count should be reduced) |

F I G. 29

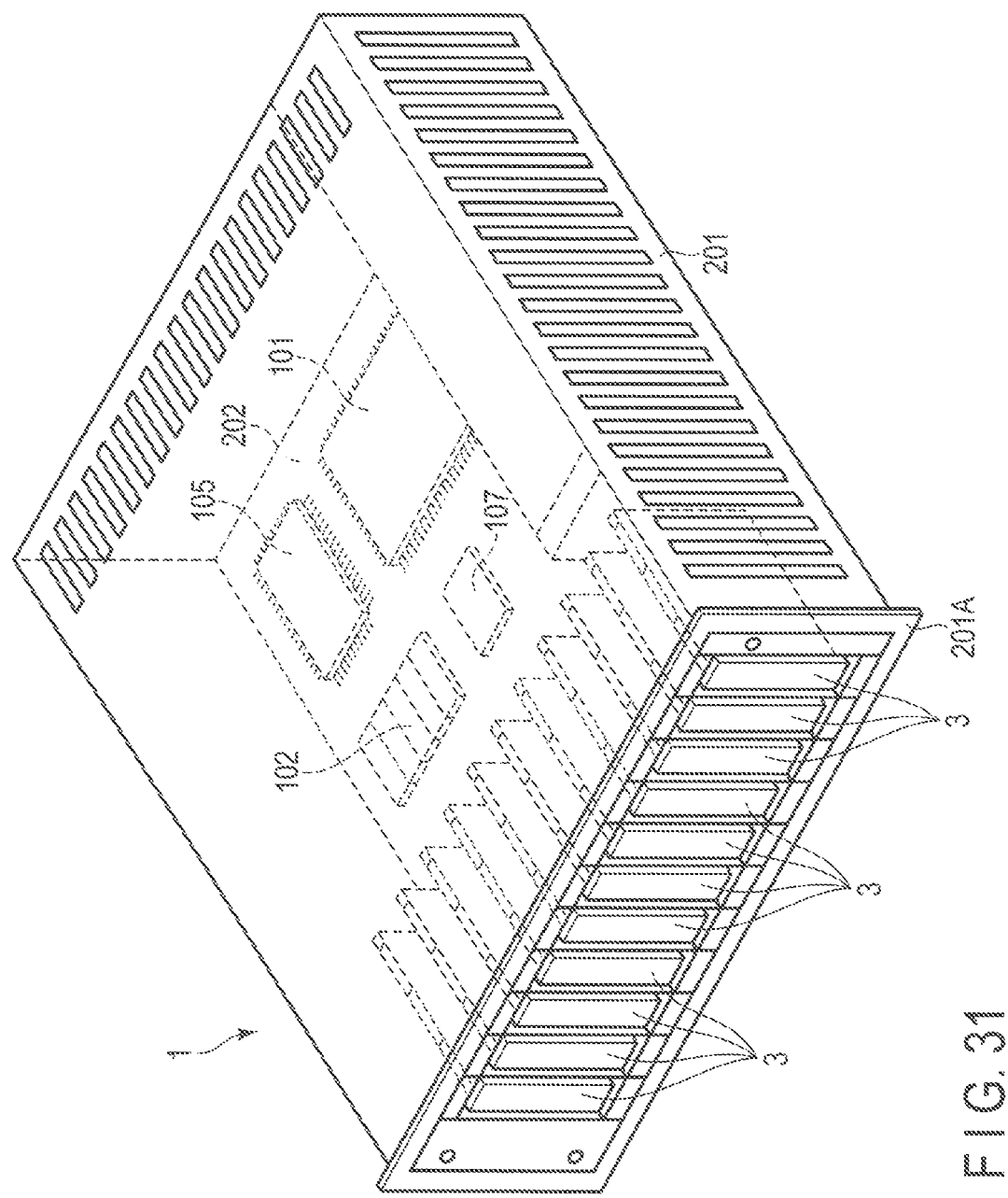
F I G. 31

MEMORY SYSTEM AND METHOD FOR CONTROLLING NONVOLATILE MEMORY

CROSS-REFERENCE TO RELATED APPLICATIONS

This application is based upon and claims the benefit of priority from Japanese Patent Application No. 2017-213955, filed Nov. 6, 2017, the entire contents of which are incorporated herein by reference.

FIELD

Embodiments described herein relate generally to a technology of controlling a nonvolatile memory.

BACKGROUND

In recent years, memory systems comprising a nonvolatile memory have become widespread. One of the memory systems has been known as a solid state drive (SSD) comprising a NAND flash memory. SSDs are used as the main storage of various computing devices.

In memory systems such as SSDs, a technology to improve the reliability is required.

BRIEF DESCRIPTION OF THE DRAWINGS

FIG. 1 is a block diagram showing a configuration example of a memory system according to a first embodiment.

FIG. 3 shows a structural example of a super block (parallel access unit) composed of a set of a plurality of blocks.

FIG. 4 is a timing chart showing a sequence of erase operation performed by the memory system of the first embodiment.

FIG. 5 shows write operation performed by the memory system of the first embodiment.

FIG. 6 shows an example of a block wear management table managed by the memory system of the first embodiment.

FIG. 7 shows another example of the block wear management table managed by the memory system of the first embodiment.

FIG. 8 is shown for explaining a write command applied to the memory system of the first embodiment.

FIG. 10 shows how the memory system of the first embodiment selects a write destination block when a block having a data retention term which is equal to the data retention term specified by a write command is present.

FIG. 13 shows how the memory system of the first embodiment selects a write destination block when a block having a data retention term which is equal to the data retention term specified by a write command is not present.

FIG. 14 shows how the memory system of the first embodiment selects a write destination block when a block having a data retention term which is equal to the data retention term specified by a write command is not present.

FIG. 15 shows the operation of writing data to the selected block in a wear reduction program mode by the memory system of the first embodiment when a block having a data retention term which is equal to the data retention term specified by a write command is not present.

FIG. 26 is a block diagram showing a configuration example of a memory system (flash storage device) according to a second embodiment.

FIG. 27 is shown for explaining a write command applied to the memory system of the second embodiment.

FIG. 28 is shown for explaining a response to the write command of FIG. 27.

FIG. 29 is shown for explaining a trim command applied to the memory system of the second embodiment.

FIG. 31 shows a structural example of a computer including the host and the memory system of the first or second embodiment.

DETAILED DESCRIPTION

Figure 2:
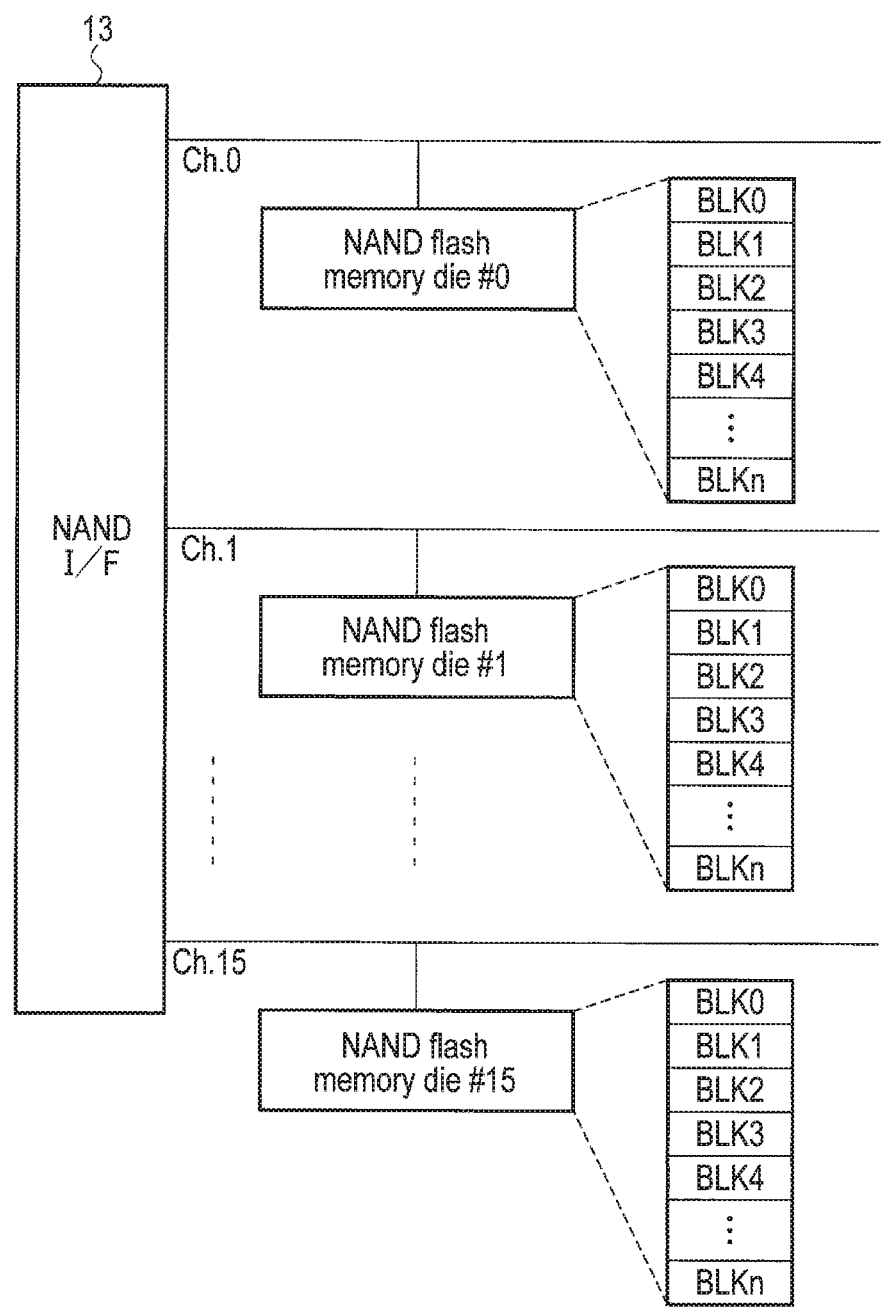
FIG. 2 is a block diagram showing the relationship between a NAND interface and a plurality of NAND flash memory dies in the memory system of the first embodiment.

Various embodiments will be described hereinafter with reference to the accompanying drawings.

In general, according to one embodiment, a memory system connectable to a host, comprises a nonvolatile memory, and a controller electrically connected to the nonvolatile memory and controlling the nonvolatile memory. The controller manages wear of each of a plurality of blocks in the nonvolatile memory. The controller receives, from the host, a write request including a parameter specifying a data retention term required for first data to be written. The controller selects, from the blocks, a first block in which a data retention term estimated from the wear of the first block is longer than or equal to the specified data retention term. The controller writes the first data to the first block.

First Embodiment

First, a configuration of an information processing system 1 including a memory system according to a first embodiment will be explained with reference to FIG. 1.

The memory system is a semiconductor storage device configured to write data to a nonvolatile memory and read data from the nonvolatile memory. The memory system is realized as, for example, a flash storage device 3 comprising a NAND flash memory. The flash storage device 3 may be realized as a solid state drive (SSD), or may be realized as a memory card.

The information processing system 1 includes a host (host device) 2 and the flash storage device 3.

The host 2 is an information processing apparatus (computing device) which accesses the flash storage device 3. The host 2 may be either a storage server (server) which stores a large amount of various types of data in the flash storage device 3 or a personal computer.

The flash storage device 3 may be used as the main storage of the information processing apparatus which functions as the host 2. The flash storage device 3 may be incorporated into the information processing apparatus or connected to the information processing apparatus via a cable or a network.

The interface used to interconnect the host 2 and the flash storage device 3 may be, for example, SCSI, Serial Attached SCSI (SAS), ATA, Serial ATA (SATA), PCI Express (PCIe), Ethernet (registered trademark), Fibre channel or NVM Express (NVMe) (registered trademark).

The flash storage device 3 comprises a controller 4 and a nonvolatile memory (NAND flash memory) 5. The controller 4 is a memory controller (control circuit) configured to control the NAND flash memory 5. The flash storage device 3 may further comprise a random access memory such as a DRAM 6.

The NAND flash memory 5 includes a memory cell array including a plurality of memory cells arrayed in matrix. The NAND flash memory 5 may be either a NAND flash memory comprising a two-dimensional structure or a NAND flash memory comprising a three-dimensional structure.

The memory cell array of the NAND flash memory 5 includes a plurality of blocks B0 to Bm−1. Each of blocks B0 to Bm−1 includes a plurality of pages (here, pages P0 to Pn−1). Blocks B0 to Bm−1 each functions as the smallest unit of erase operation. These blocks may be referred to as physical blocks or erase blocks. Each of pages P0 to Pn−1 includes a plurality of memory cells connected to the same word line. Pages P0 to Pn−1 are the units of the operation for writing data and the operation for reading data.

Blocks B0 to Bm−1 have the limited erase count. The erase count may be indicated by the number of program/erase cycles. One program/erase cycle for a certain block includes erase operation for causing all the memory cells of the block to be in an erased state and write operation (program operation) for writing data to each page of the block.

In the first embodiment, the controller 4 may manage a plurality of super blocks each including a set of blocks and perform erase operation in units of super blocks. In effect, super blocks function as erase units in some cases. Thus, the erase counts of the blocks included in the same super block are the same as each other.

The controller 4 is electrically connected to the NAND flash memory 5 which is a nonvolatile memory via a NAND interface 13 such as Toggle or ONFI. The NAND interface 13 functions as a NAND control circuit configured to control the NAND flash memory 5.

As shown in FIG. 2, the NAND flash memory 5 includes a plurality of NAND flash memory dies. Each NAND flash memory die is a nonvolatile memory die including a memory cell array including a plurality of blocks (physical blocks) BLK, and a peripheral circuit which controls the memory cell array. Each NAND flash memory die is independently operable. Thus, the NAND flash memory dies function as the smallest parallel operation units. The NAND flash memory dies may be also called NAND flash memory chips or nonvolatile memory chips. FIG. 2 exemplarily shows a case where 16 channels Ch. 0, Ch. 1, . . . , Ch. 15 are connected to the NAND interface 13, and the same number of NAND flash memory dies are connected to channels Ch. 0, Ch. 1, . . . , Ch. 15 (for example, one die for each channel). Each channel includes a communication line (memory bus) for communicating with a corresponding NAND flash memory die.

The controller 4 controls NAND flash memory dies #0 to #15 via channels Ch. 0, Ch. 1, . . . , Ch. 15. The controller 4 is capable of concurrently driving channels Ch. 0, Ch. 1, . . . , Ch. 15.

In the structural example of FIG. 2, 16 NAND flash memory dies can be operated in parallel at a maximum.

In the first embodiment, the controller 4 is capable of managing a plurality of parallel access units (super blocks) each including a plurality of blocks BLK. Each super block may include 16 blocks BLK in total selected from NAND flash memory dies #0 to #15 one by one connected to different channels although the configuration is not limited to this example. Each of NAND flash memory dies #0 to #15 may comprise a multi-plane structure. For example, when each of NAND flash memory dies #0 to #15 comprises a multi-plane structure including two planes, each super block may include 32 blocks BLK in total selected one by one from 32 planes corresponding to NAND flash memory dies #0 to #15.

FIG. 3 exemplarily shows a case where each super block SB includes 16 blocks BLK in total selected one by one from NAND flash memory dies #0 to #15. In the write operation for each super block SB, data is written in the order of page P0 of the block BLK belonging to NAND flash memory die #0, page P0 of the block BLK belonging to NAND flash memory die #1, . . . , page P0 of the block BLK belonging to NAND flash memory die #15, page P1 of the block BLK belonging to NAND flash memory die #0, page P1 of the block BLK belonging to NAND flash memory die #1, . . . , page P1 of the block BLK belonging to NAND flash memory die #15, . . . .

Now, this specification explains the configuration of the controller 4 of FIG. 1.

The controller 4 is electrically connected to a plurality of NAND flash memory chips via a plurality of channels (for example, 16 channels). The controller 4 controls the NAND flash memory 5 (a plurality of NAND flash memory chips).

The controller 4 may function as a flash translation layer (FTL) configured to perform the data management and the block management of the NAND flash memory 5. The data management performed by the FTL includes, for example, (1) the management of mapping information indicating the correspondence relationships between logical addresses and the physical addresses of the NAND flash memory 5 and (2) a process for hiding the read/write in page units and the erase operation in block units. The logical address is an address used by the host to specify the address of the flash storage device 3. As the logical address, normally, LBA (logical block address (addressing)) may be used.

The management of mapping between logical block addresses (LBAs) and physical addresses is performed by using a lookup table (LUT) 32 which functions as an address translation table (logical-to-physical address translation table). The controller 4 manages mapping between logical addresses and physical addresses in predetermined management size units, using the lookup table (LUT) 32. A physical address corresponding to a certain logical address indicates the latest physical storage location to which the data of the logical address is written in the NAND flash memory 5. The address translation table (LUT 32) may be loaded from the NAND flash memory 5 into the DRAM 6 when the flash storage device 3 is turned on.

Data can be written to pages only once per erase cycle. Thus, the controller 4 writes update data corresponding to a certain logical address to a physical storage location different from the physical storage location in which previous data corresponding to the logical address is stored. The controller 4 updates the lookup table (LUT) 32, associates the logical address with the physical storage location to which the update data is written, and invalidates the previous data.

The block management includes, for example, wear leveling, garbage collection and the like. Wear leveling is the operation for leveling the wear of each of the blocks. In garbage collection, to increase the number of free blocks to which data can be written, the valid data within some target blocks including both valid data and invalid data is copied to other block. Here, valid data indicates data which is referred to by the LUT 32 (in other words, data linked as the latest data from logical addresses) and which may subsequently be read by the host 2. The invalid data indicates data which no longer has a possibility of being read from the host 2. For example, data associated with a certain logical address is valid data. Data which is not associated with any logical address is invalid data.

In garbage collection, the lookup table (LUT) 32 is updated, and the logical addresses of the copied valid data are mapped to the respective physical addresses of the move destinations. Each block including only invalid data as valid data has been copied to another block is released as a free block. In this way, these blocks become available again after erase operation is performed to the blocks.

The controller 4 includes a host interface 11, a CPU 12, the NAND interface 13, a DRAM interface 14, etc. The CPU 12, the NAND interface 13 and the DRAM interface 14 are connected to each other via a bus 10.

The host interface 11 is a host interface circuit configured to perform communication with the host 2. The host interface 11 receives various commands (for example, a write command, a read command, an UNMAP/trim command, etc.) from the host 2.

The CPU 12 is a processor configured to control the host interface 11, the NAND interface 13 and the DRAM interface 14. When the flash storage device 3 is turned on, the CPU 12 loads a control program (firmware) stored in the NAND flash memory 5 into the DRAM 6 and performs various processes by executing the firmware. In addition to the above FTL process, for example, the CPU 12 is capable of performing a command process and the like. The command process is a process for processing various commands from the host 2. The operation of the CPU 12 is controlled by the firmware executed by the CPU 12. An FTL process and a command process may be partially or entirely performed by exclusive hardware within the controller 4.

The CPU 12 is capable of functioning as an erase count monitoring unit 21, an erasing time monitoring unit 22, a block classifying unit 23, a write operation control unit 24 and a wear reduction processing unit 25.

The erase count monitoring unit 21 monitors the erase count of each of a plurality of blocks in the NAND flash memory 5. As described above, the erase count may be indicated by the number of program/erase cycles.

The erasing time monitoring unit 22 monitors the erasing time of each of the blocks in the NAND flash memory 5. The erasing time of a certain block refers to the time required to complete erase operation for the block.

The erasing time monitoring unit 22 may obtain the erasing time of each block from an erasing time measurement unit 13A included in the NAND interface 13.

The timing chart of FIG. 4 shows an example of a sequence of erase operation for a certain block (physical block) provided in a certain NAND flash memory die. The NAND interface 13 transmits an erase setup command "60h", an address specifying a block to which erase operation should be performed and an erase start command "D0h" to the NAND flash memory die via an IO bus in a certain channel. The NAND interface 13 monitors the read/busy signal (RY/BY) of the NAND flash memory die and waits for the completion of erase operation. While erase operation is performed for the blocks of the NAND flash memory die, the NAND flash memory die is maintained in a busy state. While the NAND flash memory die is in a busy state, the read/busy signal (RY/BY) is maintained at, for example, a low level. The erasing time measurement unit 13A may measure the time (tBERASE) in which the NAND flash memory die is maintained in a busy state by the erase operation for the block as the erasing time of the block. In this case, the erasing time measurement unit 13A may measure the time in which the ready/busy signal (RY/BY) is maintained at a low level in the sequence of erase operation and notify the erasing time monitoring unit 22 of the measured time.

The NAND flash memory die performs verify operation to verify whether the erase operation for the block is successful. The erase and verify operation is repeated until the erase operation is successful or the number of iterations of the loop of the erase and verify operation reaches the maximum number of iterations. When the erase and verify operation is completed, the NAND flash memory die returns to a ready state. At this time, for example, the ready/busy signal (RY/BY) returns from a low level to a high level.

When the NAND flash memory die goes into a ready state, the NAND interface 13 transmits a status read command "70h" to the NAND flash memory chip via the IO bus. When the erase operation is successful, the NAND flash memory die notifies the NAND interface 13 of a status (pass status) indicating success. When the erase operation is not successful, the NAND flash memory die notifies the NAND interface 13 of a status (fail status) indicating failure.

Alternatively, the controller 4 may measure the erasing time (tBERASE) without using a ready/busy signal (RY/BY). In this case, the controller 4 may perform a polling operation by repeatedly issuing a status read command to the NAND flash memory die chip during erase operation.

The block classifying unit 23 classifies a plurality of blocks into a plurality of block groups corresponding to a plurality of data retention terms based on the wear of each of the blocks. The wear of a certain block means to a degree of wear of the set of memory cells included in the block. The wear of each of the blocks may be indicated by the erase count (the number of program/erase cycles) of each of the blocks. As the wear of a certain block proceeds, the erasing time (tBERASE) of the block is increased. Thus, the wear of each of the blocks may be indicated by the erasing time (tBERASE) of each of the blocks. When the wear of a block is large, electrical charge stored in each of the memory cells of the block may easily leak out. Thus, a data retention term corresponding to the block (in other words, the term in which each memory cell in the block can hold data) is shortened with increasing wear of the block. The data retention term may be simply referred to as data retention.

When the wear of each of the blocks is indicated by the erase count (in other words, the number of program/erase cycles) of each of the blocks, the block classifying unit 23 may classify a plurality of blocks into a plurality of block groups corresponding to a plurality of data retention terms based on the erase count of each of the blocks.

When the wear of each of the blocks is indicated by the erasing time of each of the blocks, the block classifying unit 23 may classify a plurality of blocks into a plurality of block groups corresponding to a plurality of data retention terms based on the erasing time of each of the blocks. The block classifying unit 23 may classify a plurality of blocks into a plurality of block groups corresponding to a plurality of data retention terms based on both the erase count and the erasing time of each of the blocks.

In the first embodiment, the operation of monitoring the wear (for example, the erase count and the erasing time) for each block and the operation of classifying blocks based on the wear (for example, the erase count and the erasing time) of each of the blocks may be performed in units of physical blocks.

When the flash storage device 3 is configured to perform write operation, read operation and erase operation in units of super blocks, the operation of monitoring the wear (for example, the erase count and the erasing time) for each block and the operation of classifying blocks based on the wear of each of the blocks (for example, the erase count and the erasing time) may be performed in units of parallel access units (super blocks) each including a plurality of physical blocks. The erase operation for each block (physical block) included in the same parallel access unit (super block) is performed in parallel. Thus, these blocks (physical blocks) have the same erase count. For the erasing time of a parallel access unit (super block), a representative value obtained from the erasing time of each block included in the parallel access unit (super block) may be used. The representative value may be the mean value of the erasing time of these blocks.

The write operation control unit 24 receives, from the host 2, a write request (write command) including a parameter specifying the data retention term required for the data to be written (write data). When the write request is received, the write operation control unit 24 selects a block in which the data retention term estimated from wear of the block is longer than or equal to the specified data retention term from the blocks included in the NAND flash memory 5 as a write destination block, and writes the data to be written (write data) to the selected block (write destination block).

The write operation control unit 24 is also capable of preferentially selecting, from blocks in which the data retention term estimated from wear of each of the blocks is longer than or equal to the data retention term specified by the write request (write command), a block having a wear corresponding to a shorter data retention term as a write destination block. In this way, for example, it is possible to prevent a block having small wear corresponding to a data retention term longer than or equal to ten years from being uselessly used to write data requiring a data retention term of one year. In other words, a block having small wear corresponding to a data retention term longer than or equal to ten years can be maintained without consumption for a write request to write data requiring a data retention term of ten years.

In this case, when a block classified into a block group having a data retention term which is equal to the data retention term specified by the write request (write command) is present, the write operation control unit 24 may select the block classified into the block group as a write destination block. When a block having a data retention term which is equal to the data retention term specified by the write request (write command) is not present, the write operation control unit 24 may select a block classified into a block group having a data retention term longer than a data retention term which is equal to the specified data retention term as a write destination block.

When the data retention term estimated from the wear of the selected block is equal to the data retention term specified by the write request (write command), the write operation control unit 24 writes data (write data) to the selected block (write destination block) by a first program operation. When the data retention term estimated from the wear of the selected block (write destination block) is longer than the data retention term specified by the write request (write command), the write operation control unit 24 writes data (write data) to the selected block (write destination block) by a second program operation.

The first program operation refers to write operation (program operation) in a normal program mode. The second program operation refers to write operation (program operation) in a program mode (hereinafter, referred to as a wear reduction program mode) in which an amount of electrical charge stored in each of the memory cells of a block is less. When data is written in a wear reduction program mode, it is possible to decrease the program voltage applied to each of the memory cells or decrease the number of applications of program voltage to each of the memory cells in comparison with a case where data is written in the normal program mode. In this way, the stress applied to each of the memory cells can be reduced. It is possible to reduce wear of each of the memory cells, thereby elongating the life of the flash storage device.

In a process for selecting a write destination block to which write data should be written, the write destination block may be selected from a group of free blocks which do not include valid data. When a write destination block selected for writing different write data is already present, the write destination block to which the write data should be written may be selected from the existing write destination block and the group of free blocks.

When the flash storage device 3 is configured to perform write operation, read operation and erase operation in units of super blocks, the write operation control unit 24 may select, as a write destination block (write destination super block), a super block in which the data retention term estimated from wear of the super block is longer than or equal to the specified data retention term from a plurality of super blocks (for example, a group of free super blocks which do not include valid data), and write the write data to the selected super block.

The wear reduction processing unit 25 performs a process for writing data to the write destination block by the second program operation (in other words, the program operation in a wear reduction program mode) in which an amount of electrical charge stored in each of the memory cells of the write destination block is less than that of the first program operation.

The DRAM interface 14 of FIG. 1 is a DRAM controller configured to access-control the DRAM 6. The storage area of the DRAM 6 is used to store a write buffer (WB) 31, the lookup table (LUT) 32 and system management information 33. The system management information 33 includes various types of management information necessary to select a write destination block having a data retention term longer than or equal to the data retention term specified by the host. For example, the system management information 33 includes a block wear management table 33A and a block wear management table 33A' as described later. The system management information 33 further includes block information. The block information includes a flag (bitmap flag) indicating the validity/invalidity of data included in each block within the NAND flash memory 5.

The DRAM interface 14 is a DRAM control circuit configured to control the DRAM 6 under the control of the CPU 12. The storage area of the DRAM 6 is partially used to store the write buffer (WB) 31, the lookup table (LUT) 32 and the system management information 33. The write buffer (WB) 31, the lookup table (LUT) 32 and the system management information 33 may be stored in an SRAM (not shown) provided in the controller 4.

Now, this specification explains the configuration of the host 2.

The host 2 is an information processing apparatus which executes various programs. The programs executed by the information processing apparatus include, for example, an application software layer 41, an operating system (OS) 42, a file system 43, and the like.

As is commonly known, the operating system (OS) 42 is software configured to manage the whole host 2, control hardware in the host 2 and perform control for allowing an application to use hardware and the flash storage device 3.

The file system 43 is used to carry out control for file operation (for example, creating, storing, updating, erasing, and the like).

When the application software layer 41 needs to transmit a request such as a read command or a write command to the flash storage device 3, the application software layer 41 transmits the request to the OS 42. The OS 42 transmits the request to the file system 43. The file system 43 translates the request into a command (for example, a read command, a write command, and the like). The file system 43 transmits the command to the flash storage device 3. When a response is received from the storage device 3, the file system 43 transmits the response to the OS 42. The OS 42 transmits the response to the application software layer 41.

FIG. 5 shows the operation for writing data by the flash storage device 3 of the first embodiment.

The state of each block is roughly categorized into an active block in which valid data is stored or a free block in which valid data is not stored. Each block which is an active block is managed by a list referred to as an active block pool 51. Each block which is a free block is managed by a list referred to as a free block pool 52.

In the first embodiment, the controller 4 selects, from blocks of the free block pool 52, a block in which a data retention term estimated from wear of the block is longer than or equal to the data retention term specified by a write request (write command) as a write destination block of the data received from the host 2. In this case, the controller 4 performs erase operation for the selected block to cause the selected block to be in a writable erased state. When the current write destination block is fully filled with the data received from the host 2, the controller 4 moves the current write destination block to the active block pool 51.

FIG. 5 shows that the write destination block is selected from the free block pool 52. However, the configuration is not limited to this example. As described above, when a block having the data retention term specified by the previous write request (write command) is already selected as the write destination block, and further when the block is not filled with valid data yet, a new write destination block may not be selected from the blocks in the free block pool 52.

For example, when the block already selected as the write destination block for the previous data from the host 2 is a block which satisfies the data retention term specified by the write request (write command) received this time, the block which satisfies the specified data retention term may be selected as the write destination block for the new write data to be written by the write request received this time. The new write data may be written to the selected block.

A plurality of blocks which are already selected as write destination blocks and are not filled with valid data may be present. For example, the following situation is applicable to such a case. One year is specified as the data retention term by a write request (write command), and a block having a data retention term of one year is selected as a write destination block. Subsequently, five years is specified as the data retention term by a write request (write command), and a block having a data retention term of five years is selected as a write destination block before the block having a data retention term of one year is filled with valid data. The block having a data retention term of five years is not filled with valid data.

When the valid data in a certain block in the active block pool 51 is partially invalidated by data updating, etc., and the amount of invalid data is reduced to a value smaller than or equal to a predetermined value, the block is a target for garbage collection. All the valid data in the block are copied to another block (free block) by the garbage collection. When all the valid data in the block are copied to another block, the controller 4 moves this block to the free block pool 52.

FIG. 6 shows the block wear management table 33A.

The block wear management table 33A is a part of the system management information 33 and manages a plurality of block groups corresponding to a plurality of wears.

The block wear management table 33A includes a plurality of entries corresponding to a plurality of wears. Each entry may include a wear field, a block address field and an estimated data retention term field. The wear field holds the levels of wears of blocks classified based on the degree of wear of each block. The level of wear is lower as the wear is small. In the example of FIG. 6, the wear of each of the blocks is indicated by the erase count of each of the blocks, and is classified into a level based on the erase count of each of the blocks.

The block address field holds a plurality of block addresses corresponding to a plurality of blocks (physical blocks) included in NAND flash memory 5, respectively. In the example of FIG. 6, the block addresses are indicated as #1, #2, #3, . . . , for the respective blocks. Each block address may be expressed by a combination of a die number and a block number within the die. For example, block address #0 of block BLK0 of NAND flash memory die #0 may be expressed as (Die #0, BLK0). Similarly, block address #2 of block BLK1 of NAND flash memory die #0 may be expressed as (Die #0, BLK1). Block address #3 of block BLK2 of NAND flash memory die #0 may be expressed as (Die #0, BLK2). Block address #n+1 of block BLKn of NAND flash memory die #0 may be expressed as (Die #0, BLKn).

In the example of FIG. 6, the block addresses of the blocks of level 1 (in which the erase count is 0 to 500) are #10, #11, #23, #30, . . . . Similarly, the block addresses of the blocks of level 2 (in which the erase count is 500 to 1000) are #9, #16, #22, #29, . . . . . The block addresses of the blocks of level 3 (in which the erase count is 1000 to 1500) are #7, #8, #21, #28, . . . . The block addresses of the blocks of level 10 (in which the erase count is 9500 to 10000) are #1, #12, . . . .

The estimated data retention term field holds the data retention term estimated based on wear. In the example of FIG. 6, the data retention term is estimated based on the erase count of each of the blocks.

In the example of FIG. 6, the estimated data retention term of the blocks of level 1 (in which the erase count is 0 to 500) is ten years. Similarly, the estimated data retention term of the blocks of level 2 (in which the erase count is 500 to 1000) is five years. The estimated data retention term of the blocks of level 3 (in which the erase count is 1000 to 1500) is one year. The estimated data retention term of the blocks of level 10 (in which the erase count is 9500 to 10000) is one week.

FIG. 7 shows the block wear management table 33A' different from that of FIG. 6.

The block wear management table 33A' is a part of the system management information 33 and manages the block addresses of blocks corresponding to the range of each wear. The block wear management table 33A' is different from the block wear management table 33A of FIG. 6 in respect that the wear of each of the blocks is indicated by the erasing time of each of the blocks, and the data retention term of each of the blocks is estimated based on the erasing time.

In a manner similar to that of the block wear management table 33A, the block wear management table 33A' includes a plurality of entries. Each entry may include a wear field, a block address field and an estimated data retention term field. The wear field holds the levels of wears of blocks classified based on the degree of wear of each block. In the example of FIG. 7, as described above, the wear of each block is indicated by the erasing time of each of the blocks, and is classified into a level based on the erasing time of each of the blocks.

The block address field holds a plurality of block addresses corresponding to a plurality of blocks included in NAND flash memory 5, respectively.

The estimated data retention term field holds the data retention term estimated based on wear. In the example of FIG. 7, the data retention term is estimated based on the erasing time of each block.

In FIG. 6, the blocks are categorized into some levels based on the range of certain wears, and the block addresses are managed for each range of wears.

However, the block addresses may be managed by arranging all the blocks of the NAND flash memory in ascending order (or descending order) based on wears of the blocks.

In the example of FIG. 7, the estimated data retention term of the blocks of level 1 (in which the erasing time is t1 to t2 sec) is ten years. Similarly, the estimated data retention term of the blocks of level 2 (in which the erasing time is t2 to t3 sec) is five years. The estimated data retention term of the blocks of level 3 (in which the erasing time is t3 to t4 sec) is one year. The estimated data retention term of the blocks of level 10 (in which the erasing time is t10 to t11 sec) is one week.

In FIG. 7, the blocks are categorized into some levels based on the range of certain wears, and the block addresses are managed for each range of wears.

However, a list of the block addresses of all the blocks in the NAND flash memory 5 may be managed by arranging the blocks in ascending order (or descending order) based on wears of the blocks.

The flash storage device 3 of the first embodiment may comprise either only one of the block wear management table 33A and the block wear management table 33A' or both of them. Even when the flash storage device 3 comprises both of them, the controller 4 of the flash storage device 3 may perform the operation for determining the wear of each of the blocks and selecting a block satisfying the data retention term specified by the host 2 based on only the erase count, or perform the operation for determining the wear of each of the blocks and selecting a block satisfying the data retention term specified by the host 2 based on only the erasing time.

The controller 4 may perform the operation for determining the wear of each of the blocks and selecting a block satisfying the data retention term specified by the host 2 based on both the erase count and the erasing time.

FIG. 8 shows an example of a write command applied to the flash storage device 3.

The write command is a command which requests the flash storage device 3 to write data. The write command may include a parameter specifying the starting LBA, a parameter specifying the length (the number of logical blocks), a parameter indicating the required-data-retention term, etc.

The starting LBA (starting logical address) indicates the first LBA of the data to be written.

The length indicates the length of the data to be written (the number of logical blocks corresponding to the data to be written).

The required-data-retention term indicates the data retention term required for the data to be written. Examples of the required-data-retention term are one week, two weeks, one month, two months, four months, six months, eight months, one year, five years, ten years, etc.

Figure 9:
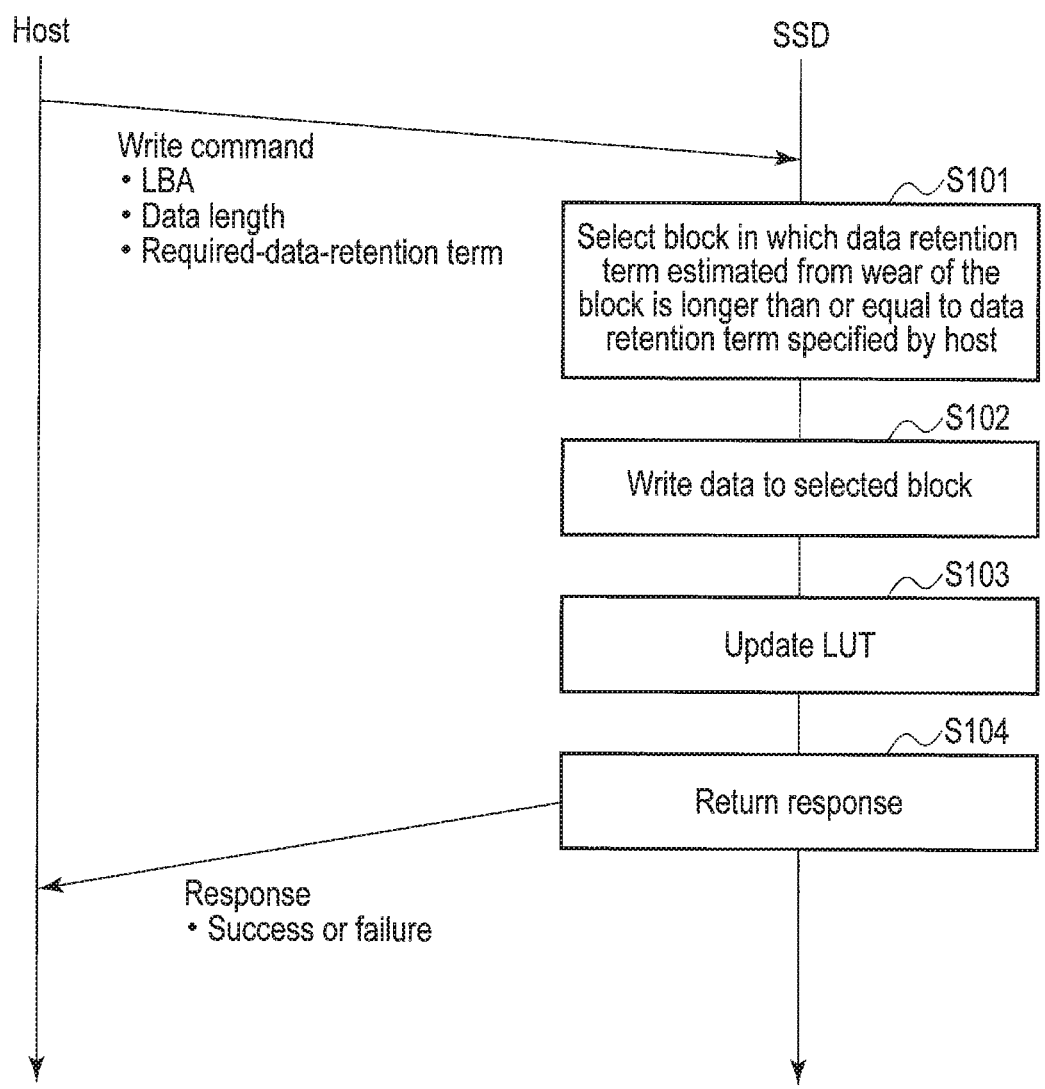
FIG. 9 shows a sequence of a data writing process performed by the memory system of the first embodiment in response to the reception of the write command of FIG. 8.

The sequence chart of FIG. 9 shows a data writing process performed by the flash storage device 3 of the first embodiment in response to the reception of the write command of FIG. 8.

The host 2 transmits a write command including an LBA, a data length and a required-data-retention term to the flash storage device 3. The controller 4 of the flash storage device 3 selects a block in which the data retention term estimated from wear of the block is longer than or equal to the data retention term specified by the host 2 (in other words, the required-data-retention term included in the write command) (step S101). Subsequently, the controller 4 writes the data to be written to the selected block (step S102). The controller 4 updates the LUT 32, and maps, to the LBA of the written data, a physical address indicating the physical storage location in the NAND flash memory 5 to which the data is written (step S103).

Subsequently, the controller 4 returns a response indicating the completion of writing to the host 2 (step S104). The response includes a status (success/failure).

Figure 11:
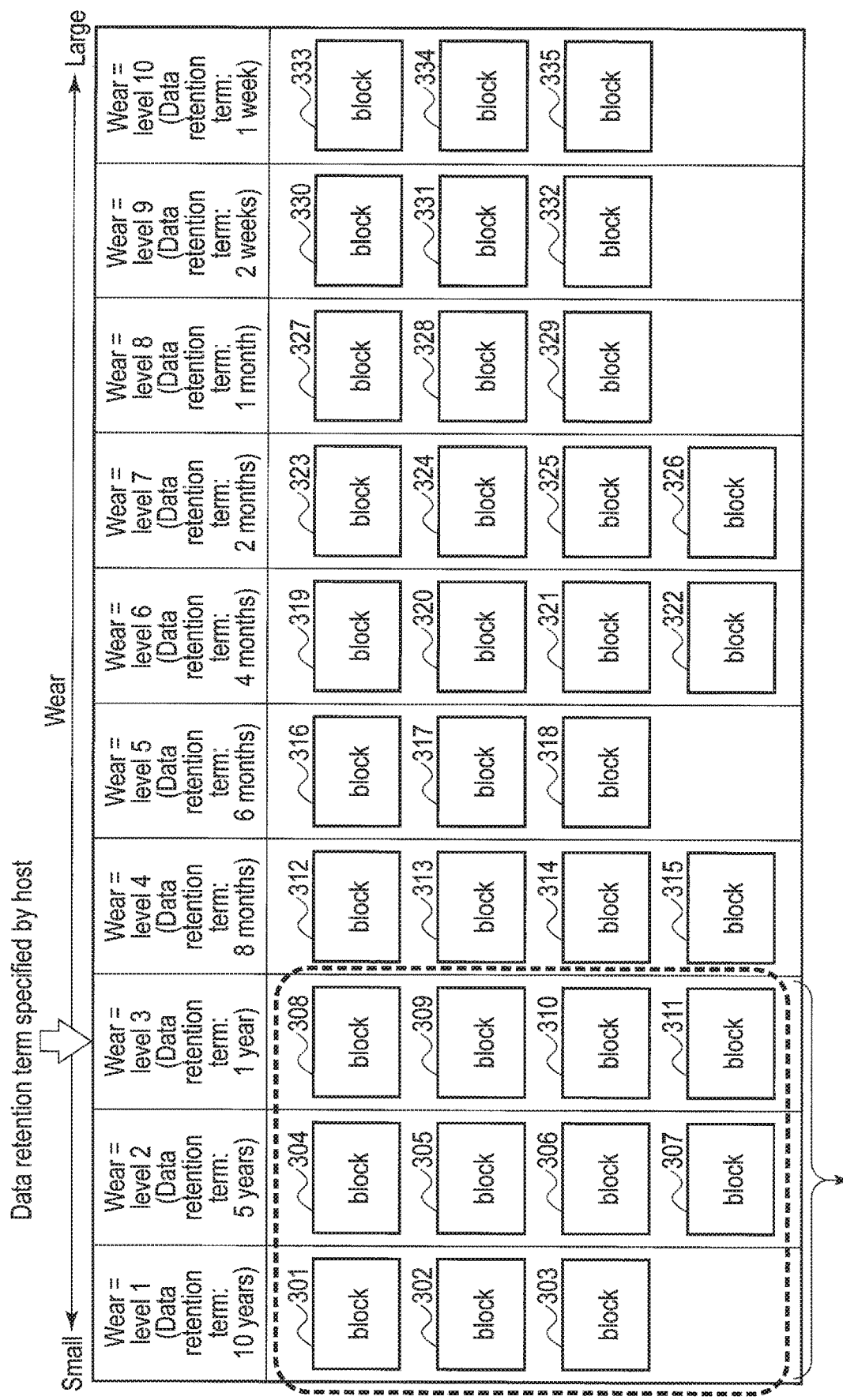
FIG. 11 shows how the memory system of the first embodiment selects a write destination block when a block having a data retention term which is equal to the data retention term specified by a write command is present.
Figure 12:
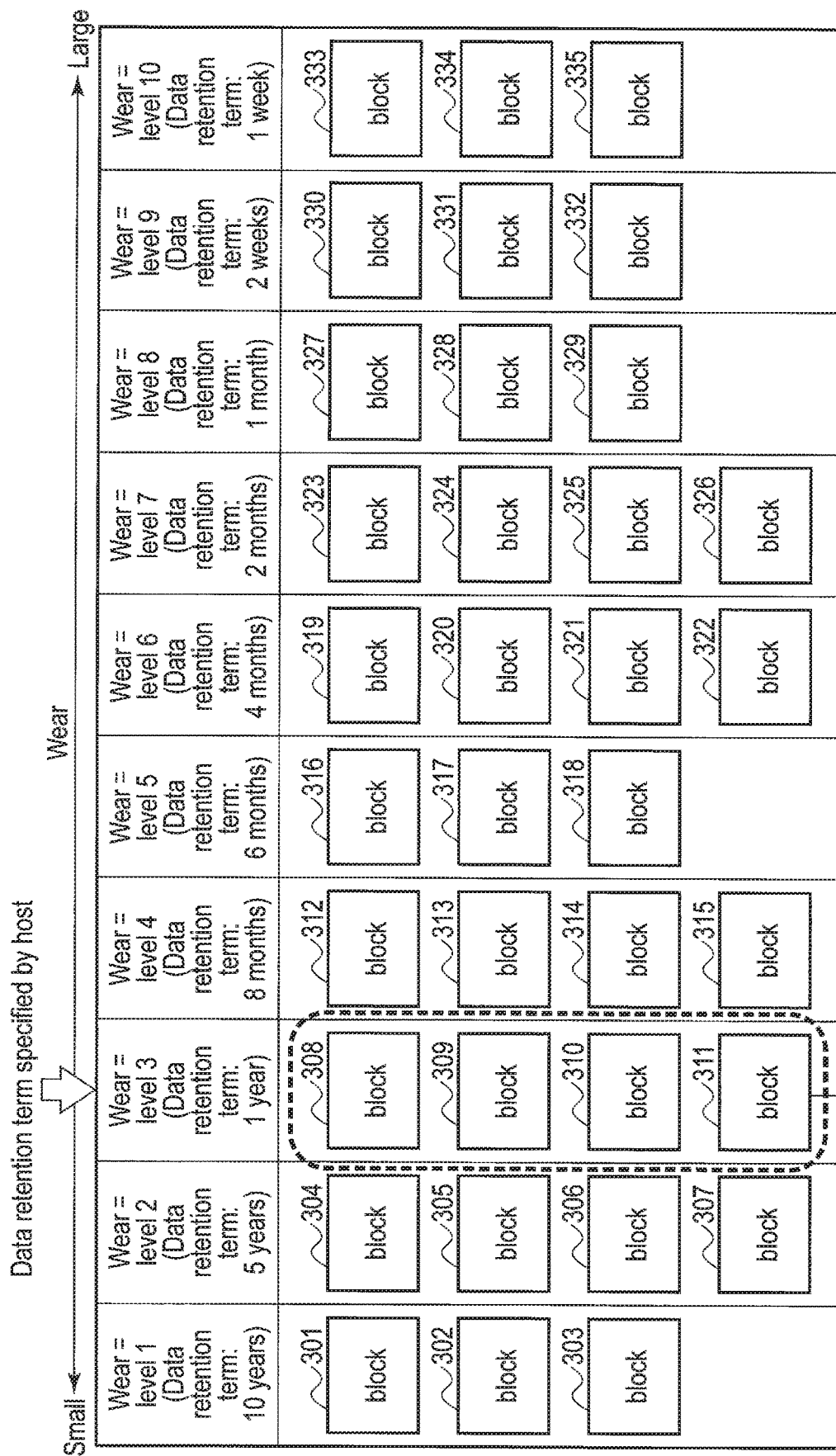
FIG. 12 shows how the memory system of the first embodiment selects a write destination block in a manner different from that of FIG. 11 when a block having a data retention term which is equal to the data retention term specified by a write command is present.

FIG. 10 to FIG. 12 show how the flash storage device 3 selects a write destination block when a block having a data retention term which is equal to the data retention term specified by a write command is present.

In FIG. 10 to FIG. 12, it is assumed that the wears of blocks 301 to 335 are managed by classifying it into 10 stages from level 1 to level 10. The data retention term is longer as the wear is smaller (in other words, as the level is lower). The data retention term is shorter as the wear is larger (in other words, as the level is higher). The wear of blocks 301 to 303 is equivalent to level 1 (the data retention term is ten years). The wear of blocks 304 to 307 is equivalent to level 2 (the data retention term is five years). The wear of blocks 308 to 311 is equivalent to level 3 (the data retention term is one year). The wear of blocks 312 to 315 is equivalent to level 4 (the data retention term is eight months). The wear of blocks 316 to 318 is equivalent to level 5 (the data retention term is six months). The wear of blocks 319 to 322 is equivalent to level 6 (the data retention term is four months). The wear of blocks 323 to 326 is equivalent to level 7 (the data retention term is two months). The wear of blocks 327 to 329 is equivalent to level 8 (the data retention term is one month). The wear of blocks 330 to 332 is equivalent to level 9 (the data retention term is two weeks). The wear of blocks 333 to 335 is equivalent to level 10 (the data retention term is one week).

It is assumed that, as shown in FIG. 11, one year is specified by the host 2 as the data retention term of the data to be written. The blocks having an estimated data retention term longer than or equal to one year specified by the host 2 as the data retention term of the data to be written are blocks 301 to 303 belonging to the group of wear=level 1, blocks 304 to 307 belonging to the group of wear=level 2, and blocks 308 to 311 belonging to the group of wear=level 3. The controller 4 selects a write destination block from these blocks 301 to 311.

Alternatively, the controller 4 may select a write destination block as shown in FIG. 12.

When one year is specified by the host 2 as the data retention term of the data to be written, the controller 4 preferentially selects, from the blocks in which the data retention term estimated from wear of each of the blocks is longer than or equal to the data retention term specified by the host 2, a block having a wear corresponding to a shorter data retention term as a write destination block. In the example of FIG. 12, of the blocks having an estimated data retention term longer than or equal to one year specified by the host 2 as the data retention term of the data to be written, blocks having a wear corresponding to a shorter data retention term are blocks 308 to 311 belonging to the group of wear=level 3 in which the estimated data retention term is one year. The controller 4 selects a write destination block from these blocks 308 to 311.

Figure 13:
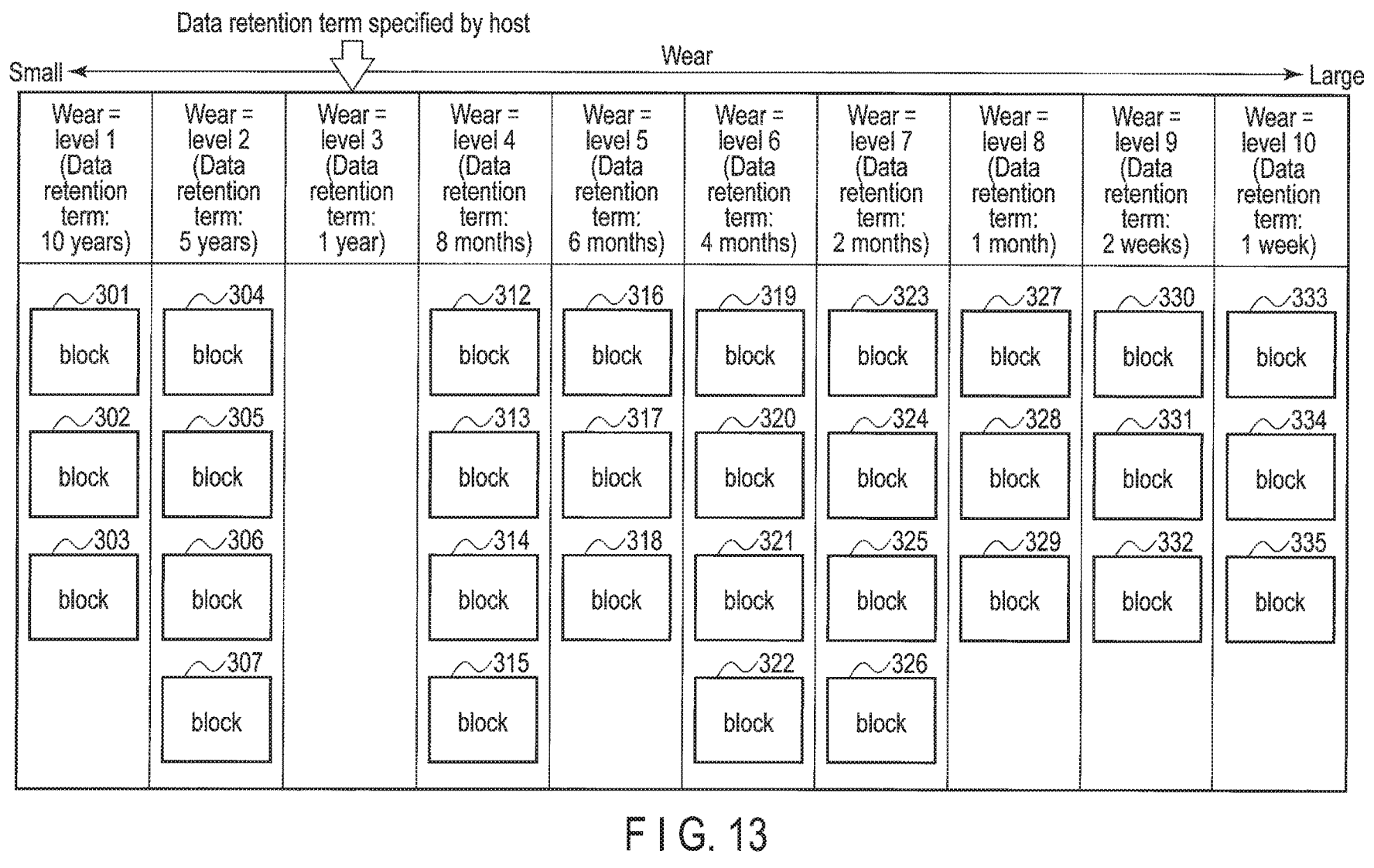

FIG. 13 and FIG. 14 show how the flash storage device 3 selects a write destination block when a block having a data retention term which is equal to the data retention term specified by a write command is not present.

As shown in FIG. 13, when a block belonging to a group (wear=level 3) having a data retention term conforming to one year which is the data retention term specified by the host 2 is not present, the controller 4 selects a write destination block from blocks belonging to a group of blocks having a data retention term longer than the specified data retention term. In FIG. 13, blocks 304 to 307 belonging to the group (wear=level 2) of blocks having the second longest data retention term (five years) after the group of wear=level 3 which is equal to the data retention term of one year specified by the host 2 are present. Thus, as shown in FIG. 14, the controller 4 selects a write destination block from blocks 304 to 307. When blocks 304 to 307 belonging to the group (wear=level 2) of blocks having the wear corresponding to the data retention term which is five years are not present, the controller 4 selects a write destination block from blocks 301 to 303 belonging to the group (wear=level 1) of blocks having the third longest data retention term (ten years).

FIG. 15 shows the operation of writing data to the selected block in a wear reduction program mode by the flash storage device 3 when a block having a data retention term which is equal to the data retention term specified by a write command is not present.

When a block having a data retention term of five years longer than the specified data retention term of one year is selected as a write destination block, in the case of FIG. 14, the controller 4 writes write data to the write destination block by the first program operation (in a normal program mode).

In the case of FIG. 15, the controller 4 switches the program mode from a normal program mode to a wear reduction program mode, and writes the write data to the write destination block in a wear reduction program mode. In a wear reduction program mode, an amount of electrical charge stored in each of memory cells of the write destination block is less than that of a normal program mode. In other words, an amount of electrical charge stored in each of memory cells of the write destination block by the program operation in the wear reduction program mode is less than an amount of electrical charge stored in each of memory cells of the write destination block by the program operation in the normal program mode. Thus, the stress applied to memory cells by write operation (program operation) can be decreased. In this way, it is possible to reduce the amount of wear of the write destination block per write operation (program operation). In program operation, each memory cell is set to a threshold voltage corresponding to one of a plurality of states. When the amount of electrical charge stored in each of memory cells is less, as the margin between threshold voltages between states is narrow, a data retention error easily occurs. As a result, the data retention term of memory cells is shortened. However, in the case of FIG. 15, the selected write destination block has a data retention term of five years far longer than the specified data retention term of one year. Thus, the wear of the selected write destination block is less. Therefore, even when write operation is performed in a wear reduction program mode, the specified data retention term of one year can be sufficiently satisfied.

Figure 16:
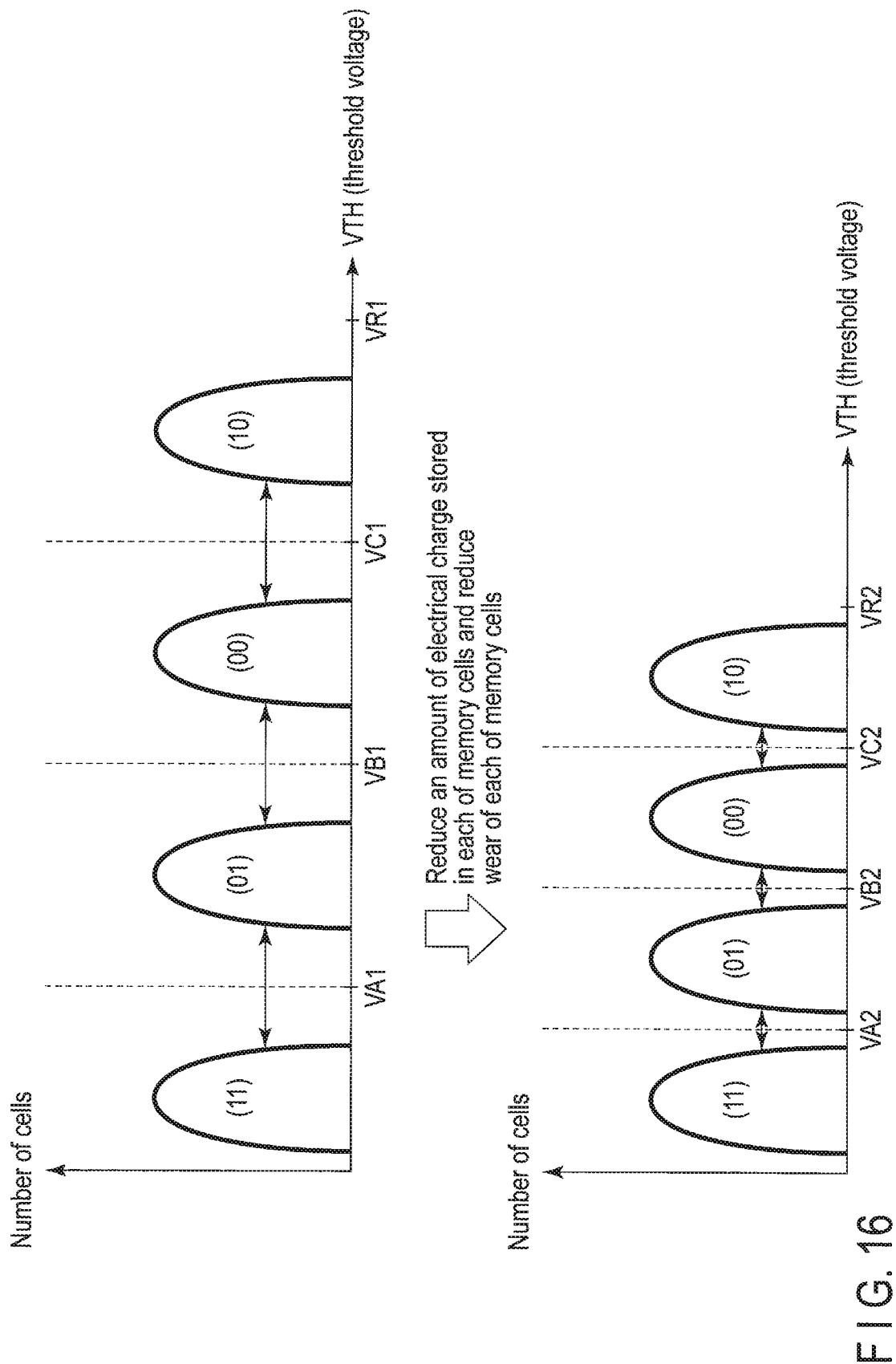
FIG. 16 is shown for explaining the threshold voltage level when the memory system of the first embodiment performs data write operation in a wear reduction program mode.

FIG. 16 shows the threshold voltage level when the flash storage device 3 performs data write operation in a wear reduction program mode.

FIG. 16 shows an example of the relationship between four threshold voltage levels and data of 2 bits corresponding to multilevel cells (MLCs).

Each memory cell is set to one of four states (an erased state and three program states). The four states have threshold voltage levels different from each other. Data of 2 bits of 11, 01, 00 and 10 may be mapped to the four states.

The upper part of FIG. 16 shows the threshold voltage level of each of the four states when write operation is performed in a normal program mode. In read operation, any one of three voltages VA1, VB1 and VC1 for separating the states of 11, 01, 00 and 10 from each other is used as read voltage. Voltage VR1 is the voltage applied to a non-selected word line in read operation. Voltage VR1 is set to voltage allowing a memory cell to be turned on regardless of the held data.

The lower part of FIG. 16 shows the threshold voltage level of each of the four states when write operation is performed in a wear reduction program mode. Any one of three voltages VA2 (<VA1), VB2 (<VB1) and VC2 (<VC1) for separating the four states of 11, 01, 00 and 10 from each other is used as read voltage. Voltage VR2 (<VR1) is the voltage applied to a non-selected word line in read operation. Voltage VR2 is set to voltage allowing a memory cell to be turned on regardless of the held data.

In a wear reduction program mode, in comparison with a normal program mode, the program voltage applied to memory cells can be decreased, or the number of applications of program voltage to memory cells can be reduced. In this way, it is possible to reduce the wear of each of the memory cells by data write operation, thereby elongating the life of the flash storage device 3.

Figure 17:
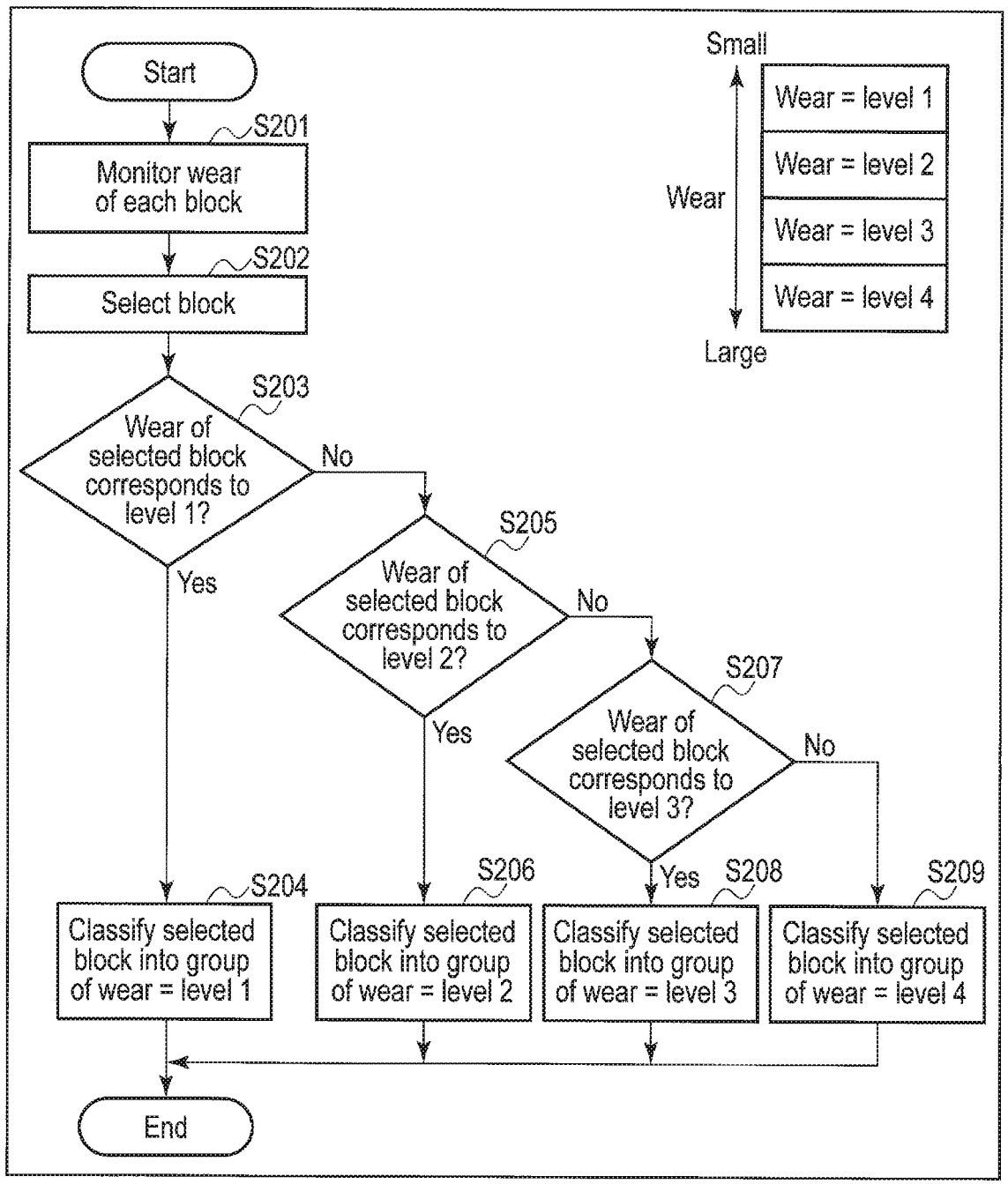
FIG. 17 is a flowchart showing a procedure for classifying blocks based on wear by the memory system of the first embodiment.

The flowchart of FIG. 17 shows the procedure for classifying blocks based on wear of each of the blocks.

To simplify the explanation, it is assumed that the blocks included in the NAND flash memory 5 are classified into the group of wear=level 1, the group of wear=level 2, the group of wear=level 3 and the group of wear=level 4.

The controller 4 monitors the wear of each block included in the NAND flash memory 5 (step S201). The controller 4 selects a block (step S202).

In the subsequent steps S203 to S209, the block selected in step S202 is classified into a group based on the wear of the selected block.

The controller 4 determines whether or not the wear of the selected block corresponds to level 1 (step S203). When the wear of the selected block corresponds to level 1 (YES in step S203), the controller 4 classifies the selected block into the group of wear=level 1 (step S204).

When the wear of the selected block does not correspond to level 1 (NO in step S203), the controller 4 determines whether or not the wear of the selected block corresponds to level 2 (step S205). When the wear of the selected block corresponds to level 2 (YES in step S205), the controller 4 classifies the selected block into the group of wear=level 2 (step S206).

When the wear of the selected block does not correspond to level 2 (NO in step S205), the controller 4 determines whether or not the wear of the selected block corresponds to level 3 (step S207). When the wear of the selected block corresponds to level 3 (YES in step S207), the controller 4 classifies the selected block into the group of wear=level 3 (step S208).

When the wear of the selected block does not correspond to level 3 (NO in step S207), the controller 4 classifies the selected block into the group of wear=level 4 (step S209).

Figure 18:
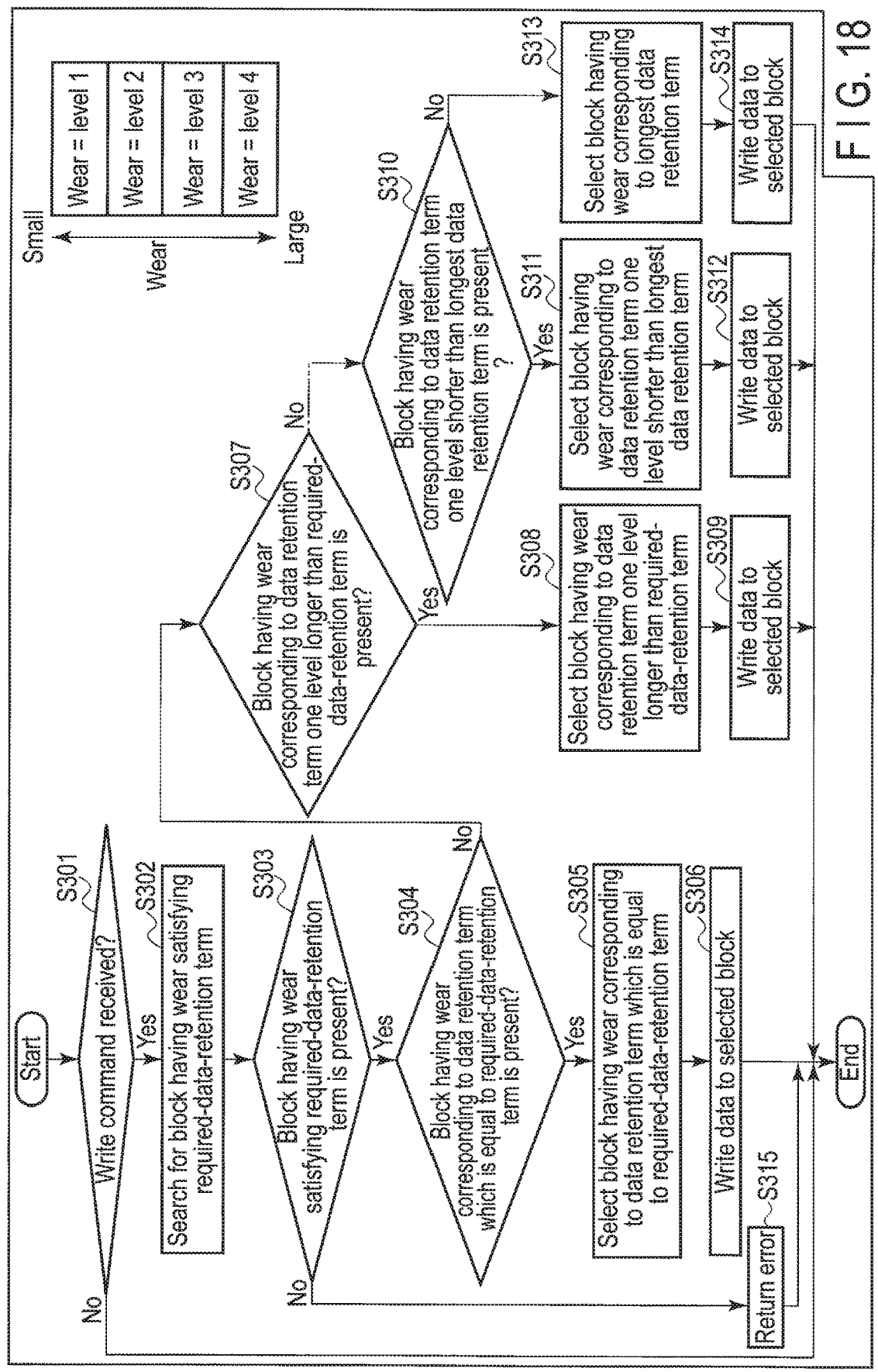
FIG. 18 is a flowchart showing a procedure for the operation of selecting a write destination block based on wear and writing data to the selected block by the memory system of the first embodiment.

The flowchart of FIG. 18 shows the procedure for the operation of selecting a write destination block based on wear each of the blocks and writing data to the selected block.

When a write command including a parameter specifying the data retention term required for the data to be written is received from the host 2 (YES in step S301), the controller 4 searches for a block having a wear satisfying the required-data-retention term (step S302), and determines whether or not a block having a wear satisfying the required-data-retention term is present (step S303). A block having a wear satisfying the required-data-retention term refers to a block in which the data retention term estimated from wear of the block is longer than or equal to the data retention term specified by the write command.

When a block having a wear satisfying the required-data-retention term is not present (NO in step S303), the controller 4 returns an error to the host 2 (step S315). When a block having a wear satisfying the required-data-retention term is not present, the data to be written cannot be written to a block satisfying the data retention term specified by the host. Thus, the data retention term required for the data to be written cannot be assured. This information is returned to the host 2 as an error.

When a block having a wear satisfying the required-data-retention term is present (YES in step S303), the controller 4 determines whether or not a block having a wear corresponding to a data retention term which is equal to the required-data-retention term is present (step S304).

When a block having a wear corresponding to a data retention term which is equal to the required-data-retention term is present (YES in step S304), the controller 4 selects the block having a wear corresponding to a data retention term which is equal to the required-data-retention term (step S305). For example, when a wear corresponding to a data retention term which is equal to the data retention term specified by the write command is level 3, the controller 4 determines whether or not a block having a wear of level 3 is present. When a block having a wear of level 3 is present, the controller 4 selects the block having a wear of level 3.

The controller 4 writes the data to be written to the selected block in a normal program mode (step S306).

When a block having a wear corresponding to a data retention term which is equal to the required-data-retention term is not present (NO in step S304), the controller 4 determines whether or not a block having a wear corresponding to a data retention term one level longer than the required-data-retention term is present (step S307). When a block having a wear corresponding to a data retention term one level longer than the required-data-retention term is present (YES in step S307), the controller 4 selects the block having a wear corresponding to a data retention term one level longer than the required-data-retention term (step S308).

For example, when a wear corresponding to a data retention term which is equal to the data retention term specified by the write command is level 3, and further when a block having a wear of level 3 is not present, the controller 4 determines whether or not a block having a wear corresponding to a data retention term one level longer than the data retention term estimated from a wear of level 3, in other words, a block having a wear of level 2, is present. When a block having a wear of level 2 is present, the controller 4 selects the block having a wear of level 2 as a write destination block.

The controller 4 writes the data to be written to the selected block in a normal program mode (step S309).

When a block having a wear corresponding to a data retention term one level longer than the required-data-retention term is not present (NO in step S307), the controller 4 determines whether or not a block having a wear corresponding to a data retention term two levels longer than the required-data-retention term is present. When a block having a wear corresponding to a data retention term two levels longer than the required-data-retention term is not present, the controller 4 determines whether or not a block having a wear corresponding to a data retention term three levels longer than the required-data-retention term is present. In this way, when a block having a wear corresponding to the determined level is not present, the controller 4 determines whether or not a block having a wear corresponding to a data retention term one level longer than the determined level is present. This operation is performed to preferentially select, as a write destination block, a block having a wear corresponding to as short a data retention term as possible from the blocks having a wear corresponding to a data retention term longer than or equal to the required-data-retention term.

For example, when a wear corresponding to a data retention term which is equal to the data retention term specified by the write command is level 3, the controller 4 determines whether or not a block having a wear of level 3 is present. When a block having a wear of level 3 is not present, the controller 4 determines whether or not a block having a wear corresponding to a wear of level 2 is present.

The controller 4 determines whether or not a block having a wear corresponding to a data retention term one level shorter than the longest data retention term is present (step S310). When a block having a wear corresponding to a data retention term one level shorter than the longest data retention term is present (YES in step S310), the controller 4 selects, as a write destination block, the block having a wear corresponding to a data retention term one level shorter than the longest data retention term (step S311).

The controller 4 writes the data to be written to the selected block in a normal program mode (step S312).

When a block having a wear corresponding to a data retention term one level shorter than the longest data retention term is not present (NO in step S310), the controller 4 selects, as a write destination block, a block having a wear corresponding to the longest data retention term (step S313). The controller 4 writes the data to be written to the selected block in a normal program mode (step S314). For example, when a wear corresponding to a data retention term which is equal to the data retention term specified by the write command is level 3, and further when neither a block having a wear of level 3 nor a block having a wear of level 2 is present, the controller 4 selects, as a write destination block, a block having a wear corresponding to the longest data retention term among the blocks having a wear corresponding to a data retention term longer than or equal to the data retention term specified by the write command, in other words, a block having a wear of level 1.

Figure 19:
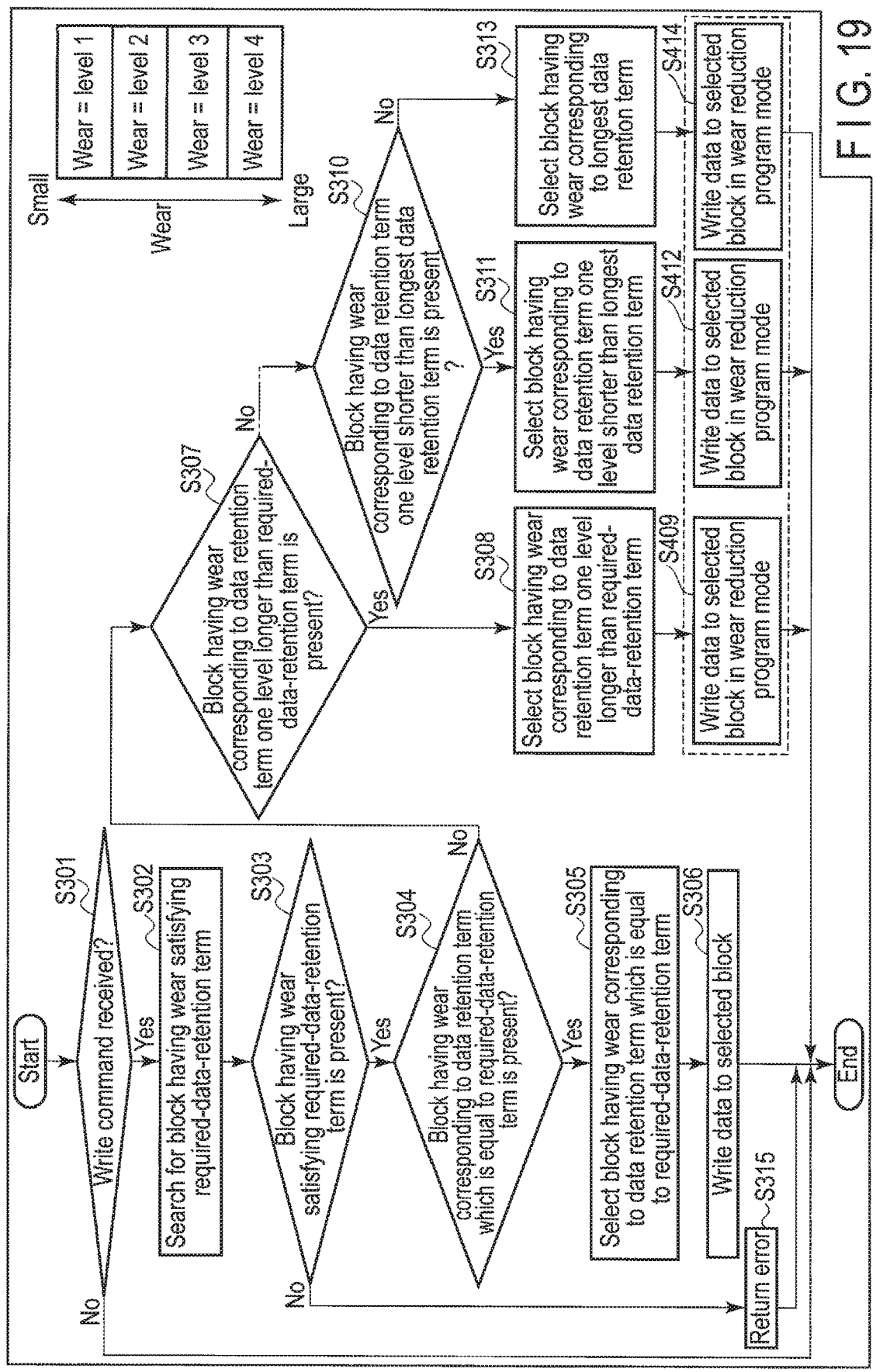
FIG. 19 is a flowchart showing a procedure for the operation of selecting a write destination block based on wear and writing data to the selected block in a wear reduction program mode by the memory system of the first embodiment.

The flowchart of FIG. 19 shows the procedure for the operation of selecting a write destination block based on wear and writing data to the selected block in a wear reduction program mode.

The flowchart of FIG. 19 is a flowchart in which step S309, step S312 and step S314 of the flowchart of FIG. 18 are changed to step S409, step S412 and step S414, respectively.

When a block having a wear corresponding to a data retention term which is equal to the required-data-retention term is selected as a write destination block (steps S303 to S305), the controller 4 writes the data to be written to the selected block in a normal program mode (step S306).

When a block having a wear corresponding to a data retention term longer than the specified data retention term is selected as a write destination block since a block having a wear corresponding to a data retention term which is equal to the required-data-retention term is not present (step S308, step S311 and step S313), the controller 4 writes the data to be written to the selected block in a wear reduction program mode (step S409, step S412 and step S414).

Figure 20:
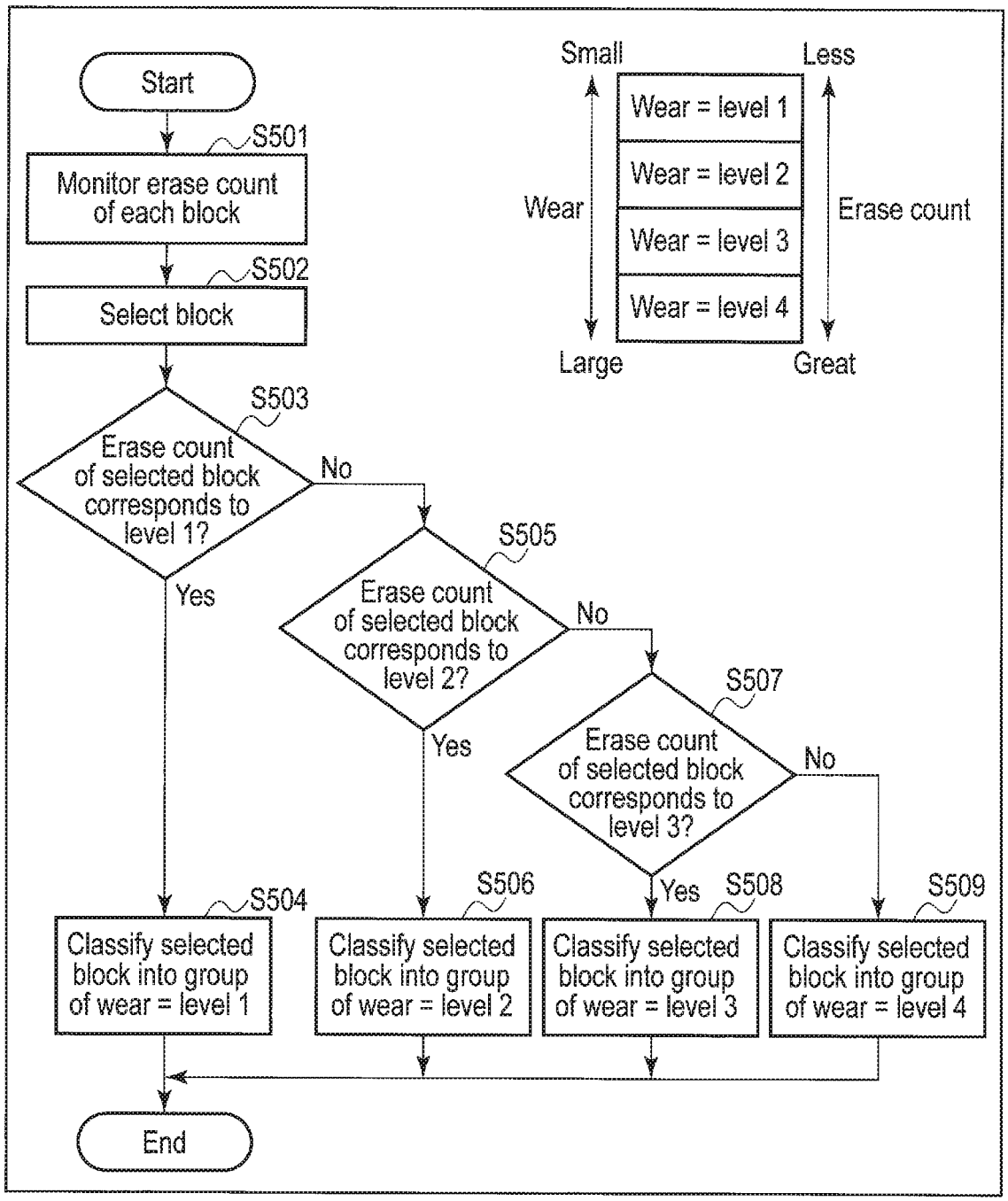
FIG. 20 is a flowchart showing a procedure for classifying blocks based on the erase count by the memory system of the first embodiment.

The flowchart of FIG. 20 shows the procedure for classifying blocks based on the erase count. Since the wear of block can be determined based on the erase count of the block, the operation of classifying blocks may be performed based on the erase count of each of the blocks. As the erase count is increased, the wear is larger. As the erase count is decreased, the wear is smaller.

The controller 4 monitors the erase count of each block included in the NAND flash memory 5 (step S501). The controller 4 selects a block (step S502).

In the subsequent steps S503 to 3509, the block selected in step 3502 is classified into a group based on the erase count of the selected block.

The controller 4 determines whether or not the erase count of the selected block corresponds to level 1 (step S503). When the erase count of the selected block corresponds to level 1 (YES in step S503), the controller 4 classifies the selected block into the group of wear=level 1 (step S504).

When the erase count of the selected block does not correspond to level 1 (NO in step S503), the controller 4 determines whether or not the erase count of the selected block corresponds to level 2 (step S505). When the erase count of the selected block corresponds to level 2 (YES in step S505), the controller 4 classifies the selected block into the group of wear=level 2 (step S506).

When the erase count of the selected block does not correspond to level 2 (NO in step S505), the controller 4 determines whether or not the erase count of the selected block corresponds to level 3 (step S507). When the erase count of the selected block corresponds to level 3 (YES in step S507), the controller 4 classifies the selected block into the group of wear=level 3 (step S508).

When the erase count of the selected block does not correspond to level 3 (NO in step S507), the controller 4 classifies the selected block into the group of wear=level 4 (step S509).

Figure 21:
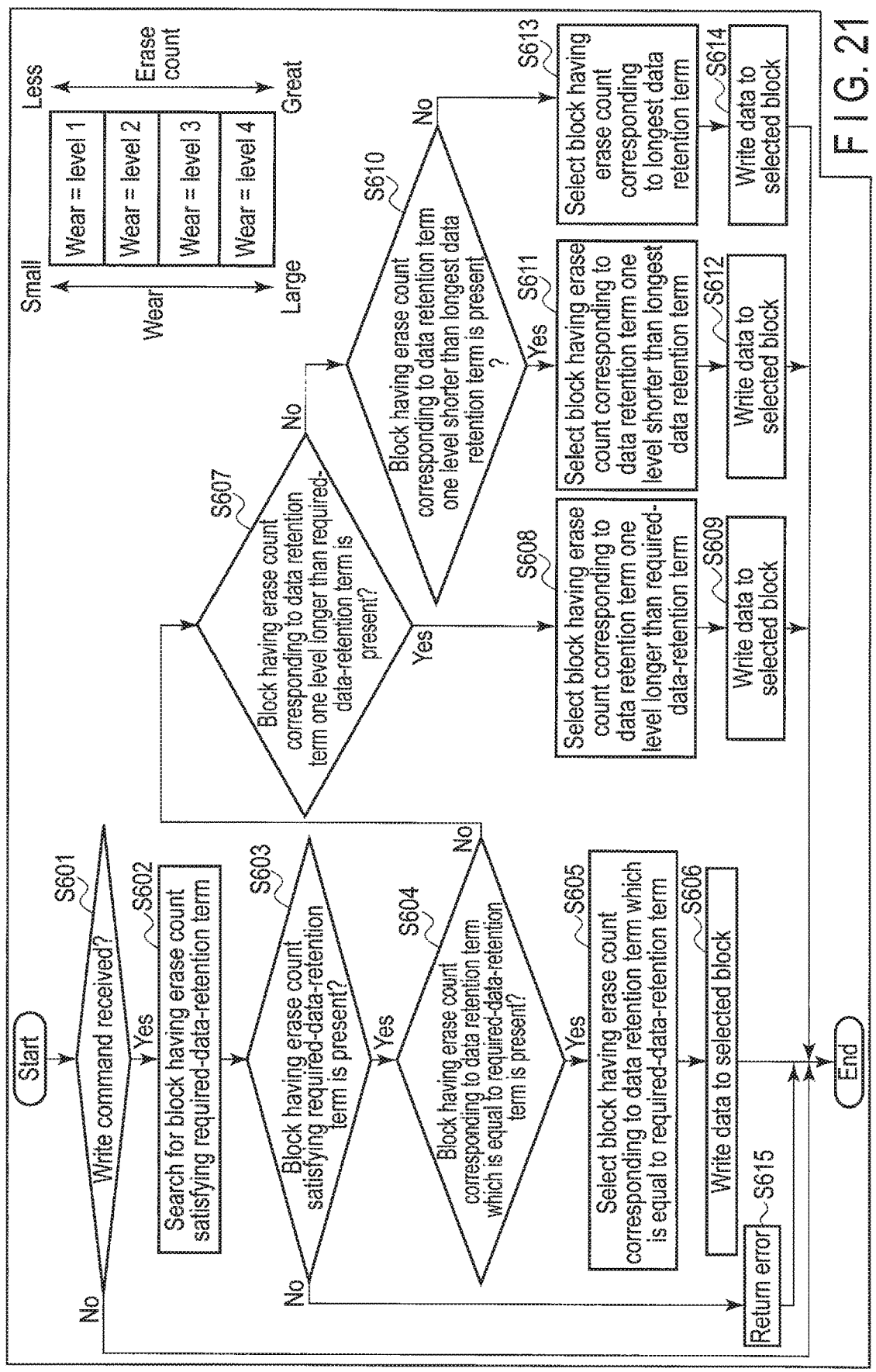
FIG. 21 is a flowchart showing a procedure for the operation of selecting a write destination block based on the erase count and writing data to the selected block by the memory system of the first embodiment.

The flowchart of FIG. 21 shows the procedure for the operation of selecting a write destination block based on the erase count and writing data to the selected block.

When a write command including a parameter specifying the data retention term required for the data to be written is received from the host 2 (YES in step S601), the controller 4 refers to the block wear management table 33A, searches for a block having an erase count satisfying the required-data-retention term (step S602), and determines whether or not a block having an erase count satisfying the required-data-retention term is present (step S603). A block having an erase count satisfying the required-data-retention term refers to a block in which the data retention term estimated from the erase count of the block is longer than or equal to the data retention term specified by the write command.

When a block having an erase count satisfying the required-data-retention term is not present (NO in step S603), the controller 4 returns an error to the host 2 (step S615).

When a block having an erase count satisfying the required-data-retention term is present (YES in step S603), the controller 4 determines whether or not a block having an erase count corresponding to a data retention term which is equal to the required-data-retention term is present (step S604).

When a block having an erase count corresponding to a data retention term which is equal to the required-data-retention term is present (YES in step S604), the controller 4 selects the block having an erase count corresponding to a data retention term which is equal to the required-date-retention term (step S605). The controller 4 writes the data to be written to the selected block in a normal program mode (step S606).

When a block having an erase count corresponding to a data retention term which is equal to the required-data-retention term is not present (NO in step S604), the controller 4 determines whether or not a block having an erase count corresponding to a data retention term one level longer than the required-data-retention term is present (step S607). When a block having an erase count corresponding to a data retention term one level longer than the required-data-retention term is present (YES in step S607), the controller 4 selects the block having an erase count corresponding to a data retention term one level longer than the required-date retention term (step S608). The controller 4 writes the data to be written to the selected block in a normal program mode (step S609).

When a block having an erase count corresponding to a data retention term one level longer than the required-data retention term is not present (NO in step S607), the controller 4 determines whether or not a block having an erase count corresponding to a data retention term two levels longer than the required-data-retention term is present. When a block having an erase count corresponding to a data retention term two levels longer than the required-data-retention term is not present, the controller 4 determines whether or not a block having an erase count corresponding to a data retention term three levels longer than the required-data-retention term is present. In this way, when a block having an erase count corresponding to the determined level is not present, the controller 4 determines whether or not a block having an erase count corresponding to a data retention term one level longer than the determined level is present. This operation is performed to preferentially select, as a write destination block, a block having an erase count corresponding to as short a data retention term as possible from the blocks having an erase count corresponding to a data retention term longer than or equal to the required-data-retention term.

The controller 4 determines whether or not a block having an erase count corresponding to a data retention term one level shorter than the longest data retention term is present (step S610). When a block having an erase count corresponding to a data retention term one level shorter than the longest data retention term is present (YES in step S610), the controller 4 selects, as a write destination block, the block having an erase count corresponding to a data retention term one level shorter than the longest data retention term (step S611). The controller 4 writes the data to be written to the selected block in a normal program mode (step S612).

When a block having an erase count corresponding to a data retention term one level shorter than the longest data retention term is not present (NO in step S610), the controller 4 selects, as a write destination block, a block having an erase count corresponding to the longest data retention term (step S613). The controller 4 writes the data to be written to the selected block in a normal program mode (step S614).

Figure 22:
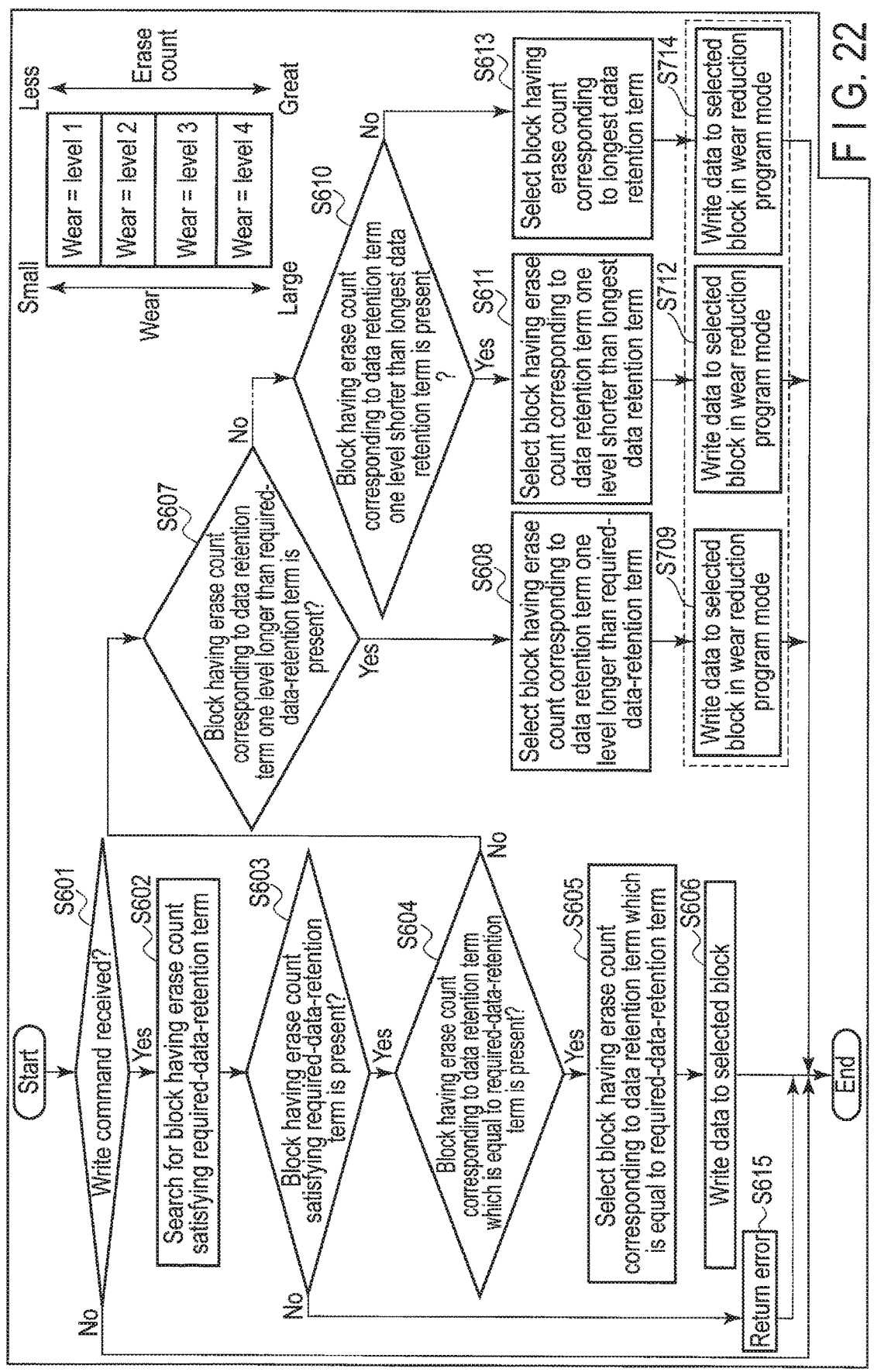
FIG. 22 is a flowchart showing a procedure for the operation of selecting a write destination block based on the erase count and writing data to the selected block in a wear reduction program mode by the memory system of the first embodiment.

The flowchart of FIG. 22 shows the procedure for the operation of selecting a write destination block based on the erase count and writing data to the selected block in a wear reduction program mode.

The flowchart of FIG. 22 is a flowchart in which step S609, step S612 and step S614 of the flowchart of FIG. 21 are changed to step S709, step S712 and step S714, respectively.

When a block having an erase count corresponding to a data retention term which is equal to the required-data-retention term is selected as a write destination block (steps S603 to S605), the controller 4 writes the data to be written to the selected block in a normal program mode (step S606).

When a block having an erase count corresponding to a data retention term longer than the specified data retention term is selected as a write destination block since a block having an erase count corresponding to a data retention term which is equal to the required-data-retention term is not present (step S608, step S611 and step S613), the controller 4 writes the data to be written to the selected block in a wear reduction program mode (step S709, step S712 and step S714).

Figure 23:
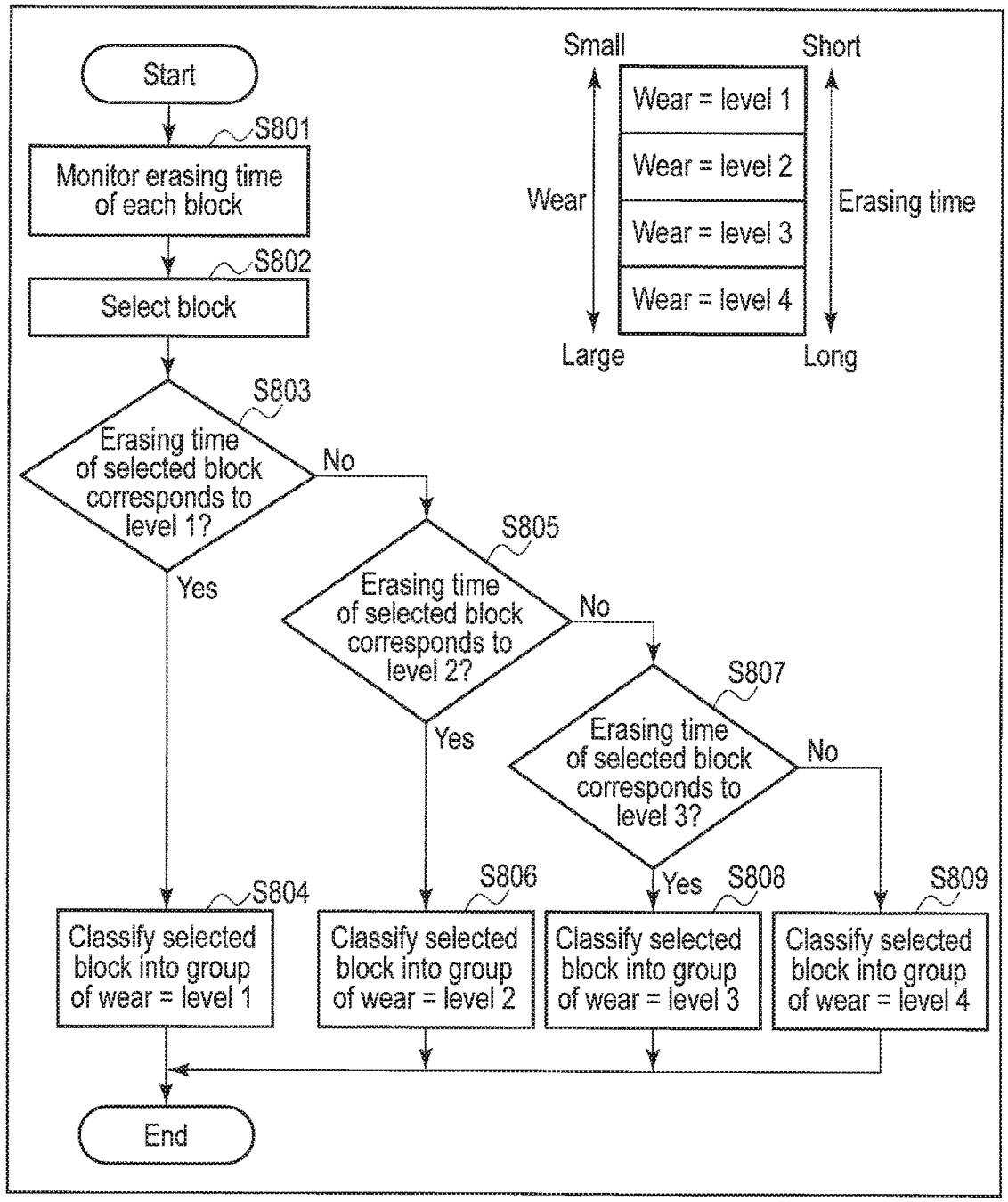
FIG. 23 is a flowchart showing a procedure for classifying blocks based on the erasing time by the memory system of the first embodiment.

The flowchart of FIG. 23 shows the procedure for classifying blocks based on the erasing time. Since the wear of block can be determined based on the erasing time of the block, the operation of classifying blocks may be performed based on the erasing time of each of the blocks. As the erasing time is increased, the wear is larger. As the erasing time is decreased, the wear is smaller.

The controller 4 monitors the erasing time of each block included in the NAND flash memory 5 (step S801). The controller 4 selects a block (step S802).

In the subsequent steps S803 to S809, the block selected in step S802 is classified into a group based on the erasing time of the selected block.

The controller 4 determines whether or not the erasing time of the selected block corresponds to level 1 (step S803). When the erasing time of the selected block corresponds to level 1 (YES in step S803), the controller 4 classifies the selected block into the group of wear=level 1 (step S804).

When the erasing time of the selected block does not correspond to level 1 (NO in step S803), the controller 4 determines whether or not the erasing time of the selected block corresponds to level 2 (step S805). When the erasing time of the selected block corresponds to level 2 (YES in step S805), the controller 4 classifies the selected block into the group of wear=level 2 (step S806).

When the erasing time of the selected block does not correspond to level 2 (NO in step S805), the controller 4 determines whether or not the erasing time of the selected block corresponds to level 3 (step S807). When the erasing time of the selected block corresponds to level 3 (YES in step S807), the controller 4 classifies the selected block into the group of wear=level 3 (step S808).

When the erasing time of the selected block does not correspond to level 3 (NO in step S807), the controller 4 classifies the selected block into the group of wear=level 4 (step S809).

Figure 24:
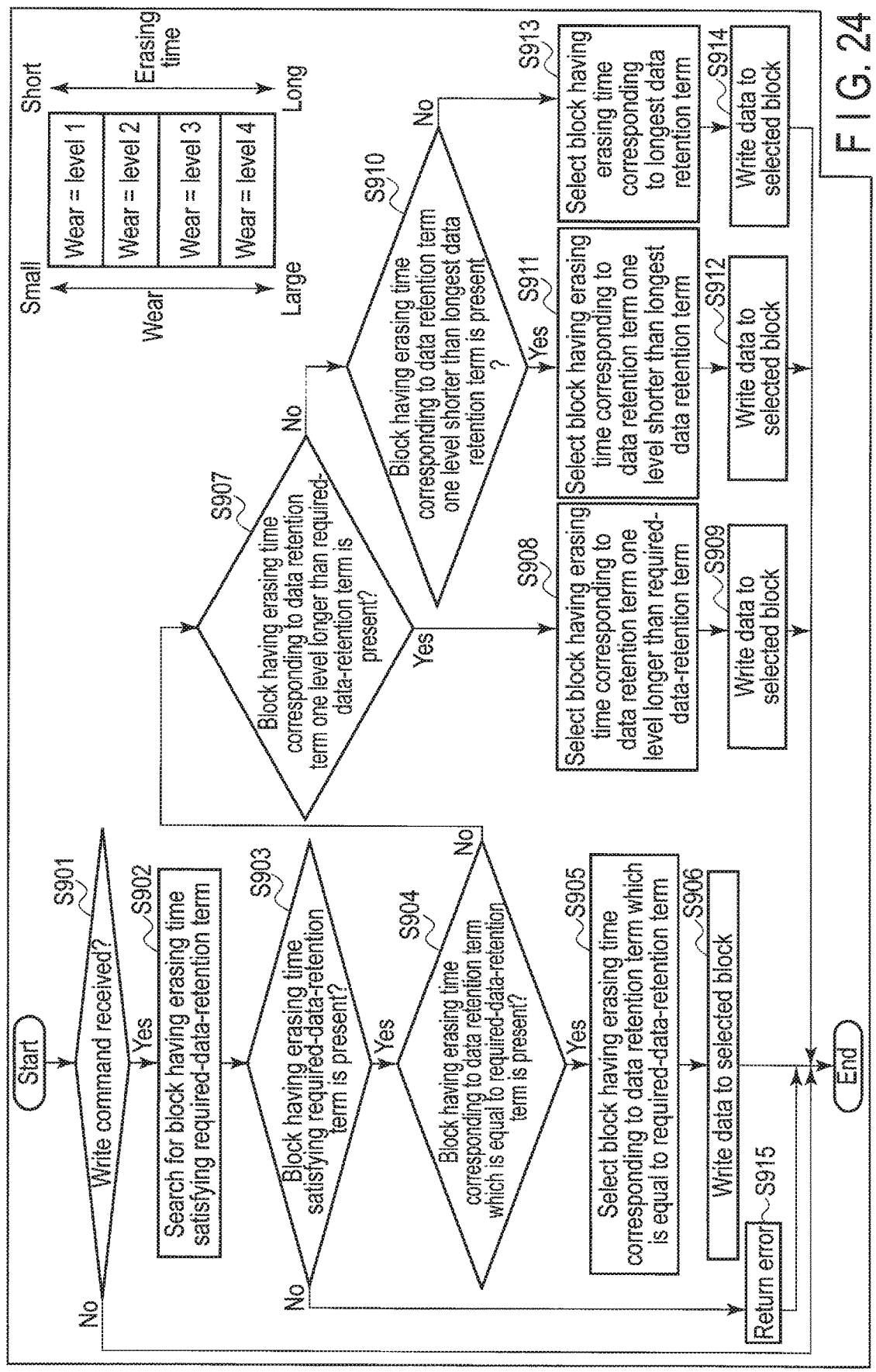
FIG. 24 is a flowchart showing a procedure for the operation of selecting a write destination block based on the erasing time and writing data to the selected block by the memory system of the first embodiment.

The flowchart of FIG. 24 shows the procedure for the operation of selecting a write destination block based on the erasing time and writing data to the selected block.

When a write command including a parameter specifying the data retention term required for the data to be written is received from the host 2 (YES in step S901), the controller 4 refers to the block wear management table 33A', searches for a block having an erasing time satisfying the required-data-retention term (step S902), and determines whether or not a block having an erasing time satisfying the required-data-retention term is present (step S903). A block having an erasing time satisfying the required-data-retention term refers to a block in which the data retention term estimated from the erasing time of the block is longer than or equal to the data retention term specified by the write command.

When a block having an erasing time satisfying the required-data-retention term is not present (NO in step S903), the controller 4 returns an error to the host 2 (step S915).

When a block having an erasing time satisfying the required-data-retention term is present (YES in step S903), the controller 4 determines whether or not a block having an erasing time corresponding to a data retention term which is equal to the required-data-retention term is present (step S904).

When a block having an erasing time corresponding to a data retention term which is equal to the required-data-retention term is present (YES in step S904), the controller 4 selects the block having an erasing time corresponding to a data retention term which is equal to the required-data retention term (step S905). The controller 4 writes the data to be written to the selected block in a normal program mode (step S906).

When a block having an erasing time corresponding to a data retention term which is equal to the required-data-retention term is not present (NO in step S904), the controller 4 determines whether or not a block having an erasing time corresponding to a data retention term one level longer than the required-data-retention term is present (step S907). When a block having an erasing time corresponding to a data retention term one level longer than the required-data-retention term is present (YES in step S907), the controller 4 selects the block having an erasing time corresponding to a data retention term one level longer than the required-data-retention term (step S908). The controller 4 writes the data to be written to the selected block in a normal program mode (step S909).

When a block having an erasing time corresponding to a data retention term one level longer than the required-data-retention term is not present (NO in step S907), the controller 4 determines whether or not a block having an erasing time corresponding to a data retention term two levels longer than the required-data-retention term is present. When a block having an erasing time corresponding to a data retention term two levels longer than the required-data-retention term is not present, the controller 4 determines whether or not a block having an erasing time corresponding to a data retention term three levels longer than the required-data-retention term is present. In this way, when a block having an erasing time corresponding to the determined level is not present, the controller 4 determines whether or not a block having an erasing time corresponding to a data retention term one level longer than the determined level is present. This operation is performed to preferentially select, as a write destination block, a block having an erasing time corresponding to as short a data retention term as possible from the blocks having an erasing time corresponding to a data retention term longer than or equal to the required-data-retention term.

The controller 4 determines whether or not a block having an erasing time corresponding to a data retention term one level shorter than the longest data retention term is present (step S910). When a block having an erasing time corresponding to a data retention term one level shorter than the longest data retention term is present (YES in step S910), the controller 4 selects, as a write destination block, the block having an erasing time corresponding to a data retention term one level shorter than the longest data retention term (step S911). The controller 4 writes the data to be written to the selected block in a normal program mode (step S912).

When a block having an erasing time corresponding to a data retention term one level shorter than the longest data retention term is not present (NO in step S910), the controller 4 selects, as a write destination block, a block having an erasing time corresponding to the longest data retention term (step S913). The controller 4 writes the data to be written to the selected block in a normal program mode (step S914).

Figure 25:
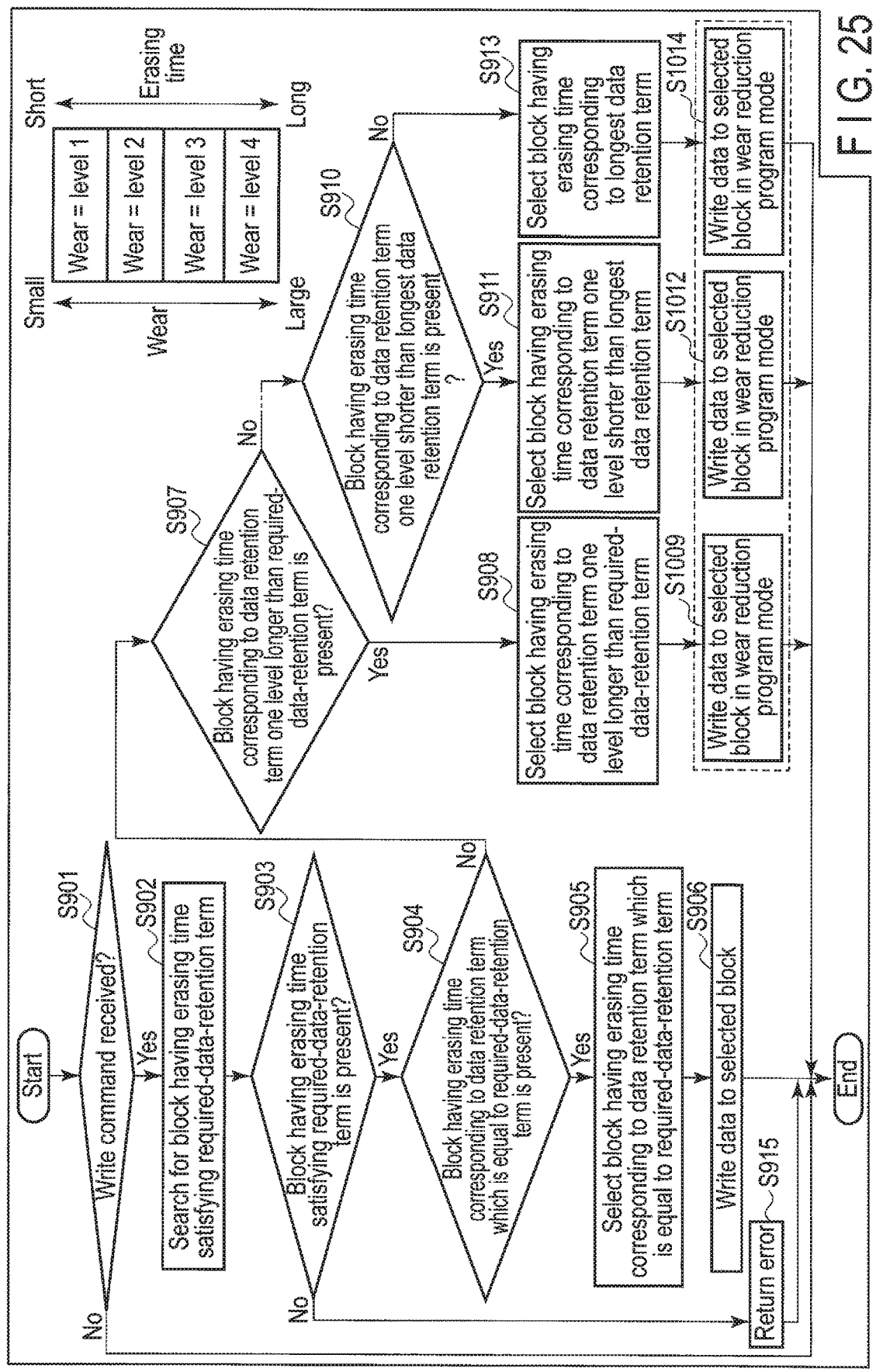
FIG. 25 is a flowchart showing a procedure for the operation of selecting a write destination block based on the erasing time and writing data to the selected block in a wear reduction program mode by the memory system of the first embodiment.

The flowchart of FIG. 25 shows the procedure for the operation of selecting a write destination block based on the erasing time and writing data to the selected block in a wear reduction program mode.

The flowchart of FIG. 25 is a flowchart in which step S909, step S912 and step S914 of the flowchart of FIG. 24 are changed to step S1009, step S1012 and step S1014, respectively.

When a block having an erasing time corresponding to a data retention term which is equal to the required-data-retention term is selected as a write destination block (steps S903 to S905), the controller 4 writes the data to be written to the selected block in a normal program mode (step S906).

When a block having an erasing time corresponding to a data retention term longer than the specified data retention term is selected as a write destination block since a block having an erasing time corresponding to a data retention term which is equal to the required-data-retention term is not present (step S908, step S911 and step S913), the controller 4 writes the data to be written to the selected block in a wear reduction program mode (step S1009, step S1012 and step S1014).

Second Embodiment

In the first embodiment, the lookup table (LUT) 32 which manages the mapping between logical addresses and physical addresses is provided in the flash storage device 3. In a second embodiment, a host 2 comprises a lookup table (LUT) 32A which manages the mapping between logical addresses and physical addresses. The lookup table (LUT) 32 is not provided in a flash storage device 3.

Hereinafter, only the matters different from those of the first embodiment are explained.

FIG. 26 shows a configuration example of an information processing system 1 including a memory system according to the second embodiment.

The second embodiment is different from the first embodiment in which the flash storage device 3 does not comprise the LUT 32. In place of the LUT 32, the LUT 32A is provided in a flash storage manager 44 provided in the host 2.

The LUT 32A manages the mapping between logical addresses and the physical addresses of the flash storage device 3. In the LUT 32A, each logical address is an identifier (tag) for identifying data. Each logical address (tag) may be an LBA, a key of a key-value store or a file identifier such as a file name. The LUT 32A is managed by the flash storage manager 44. The LUT 32A is updated by the flash storage manager 44.

The flash storage device 3 comprises system management information 33 including, in a manner similar to that of the first embodiment, a block wear management table 33A, a block wear management table 33A' and block information. The block information includes, as described above, a flag (bitmap flag) indicating the validity/invalidity of data included in each block in an NAND flash memory 5.

FIG. 27 shows a write command applied to the flash storage device 3 of the second embodiment.

The write command is a command which requests the flash storage device 3 to write data. The write command may include a parameter specifying the QoS domain ID, a parameter specifying the logical address, a parameter specifying the length, a parameter specifying the required-data-retention term, etc.

The QoS domain ID is an identifier for uniquely identifying the QoS domain to which data should be written. A write command transmitted from the host 2 in response to a write request from a certain end user may include a QoS domain ID specifying a QoS domain corresponding to the end user. A namespace ID may be used as the QoS domain ID.

The logical address is a tag for identifying the data to be written, and is equivalent to, for example, an LBA, a key of a key-value store or a file identifier.

The length indicates the length of the data to be written. The length may be specified by the number of LBAs. Alternatively, the length may be specified by bytes.

The required-data-retention term indicates the data retention term (for example, one week, two weeks, one month, two months, four months, six months, eight months, one year, five years, ten years, etc.) required for the data to be written.

FIG. 28 shows a response to the write command of FIG. 27.

The response includes a logical address, a physical address and a length.

The logical address is the logical address which is included in the write command of FIG. 27.

The physical address indicates the physical address of the physical storage location in the NAND flash memory 5 to which data is written in response to the write command of FIG. 27.

The length indicates the length of the written write data. The length may be specified by the number of LBAs. Alternatively, the length may be specified by bytes.

FIG. 29 shows a trim command applied to the flash storage device 3 of the second embodiment.

The trim command includes a physical address and a length.

The physical address indicates the first physical storage location in which the data to be invalidated (in other words, the data whose reference count should be reduced) is stored.

The length indicates the length of the data to be invalidated (in other words, the data whose reference count should be reduced). The length (data length) may be specified by bytes.

A controller 4 manages a flag (bitmap flag) indicating the validity/invalidity of each data included in each block. When a trim command including the physical address indicating the physical storage location in which the data to be invalidated is stored is received from the host 2, the controller 4 updates the block information which is a part of the system management information 33, and changes a flag (bitmap flag) corresponding to the data of the physical storage location corresponding to the physical address included in the trim command to a value indicating invalidity.

Figure 30:
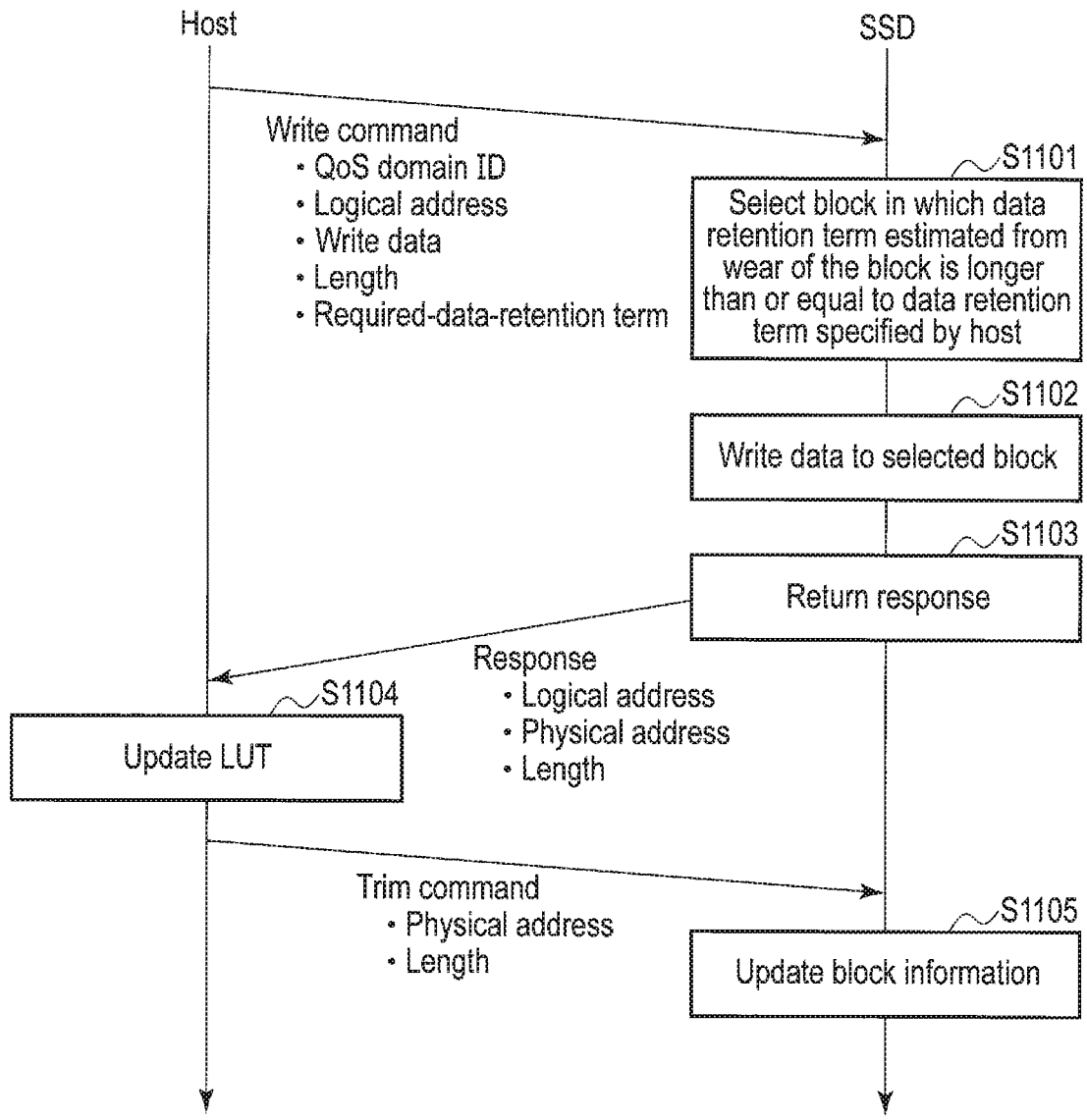
FIG. 30 shows the sequence of a data write process performed by a host and the memory system of the second embodiment.

The sequence chart of FIG. 30 shows a data writing process performed by the host 2 and the flash storage device 3 in response to the reception of the write command of FIG. 27.

The host 2 transmits a write command including a QoS domain ID, a logical address, write data, a length and a required-data-retention term to the flash storage device 3. When the controller 4 of the flash storage device 3 receives the write command, the controller 4 selects a block in which the data retention term estimated from wear of the block is longer than or equal to the data retention term specified by the host 2 (step S1101), determines the write location in the selected block, and writes the write data to the write location in the selected block (step S1102).

Subsequently, the controller 4 returns a response to the write command to the host 2 (step S1103). The response includes a logical address, a physical address and a length. The physical address specifies both the selected block and the write location in the selected block. The physical address may be expressed by a block address indicating the selected block and an offset within the block (the selected block). The offset (in-block offset) is indicative of the write location in the block.

When the host 2 receives the response, the host 2 updates the LUT 32A managed by the host 2, and maps the physical address to a logical address corresponding to the written write data (step S1104).

Subsequently, the host 2 transmits, to the flash storage device 3, a trim command for invalidating the previous data which becomes unnecessary by the writing of the update data.

The controller 4 of the flash storage device 3 updates the block information in response to the trim command (step S1105). The updating of block information refers to updating block information which is a part of the system management information 33 and changing a flag (bitmap flag) corresponding to the data of a physical storage location corresponding to the physical address included in the trim command to a value indicating invalidity.

FIG. 31 shows a structural example of the host 2 into which the flash storage devices 3 are incorporated.

The information processing apparatus is provided with a rack-mountable thin box-like housing 201. A large number of flash storage devices 3 may be provided in the housing 201. In this case, each flash storage device 3 may be removably inserted into a slot provided in the front surface 201A of the housing 201.

A system board (mother board) 202 is arranged inside the housing 201. Various electronic components including a CPU 101, a memory 102, a network controller 105 and a controller 107 are mounted on the system board (motherboard) 202. The electronic components function as the host 2.

As explained above, in the first and second embodiments, when a write request including a parameter specifying the data retention term required for the data to be written is received from the host 2, a block in which the data retention term estimated from wear of the block is longer than or equal to the data retention term specified by the host is selected as a write destination block. Data is written to the selected block. In this way, in environment where write requests specifying different data retention terms are present, a plurality of blocks having different wears can be optimally allocated for a plurality of types of data having different required-data-retention terms.

For example, a block which has small wear can be allocated as a write destination block to a write request of data requiring a data retention term of five years. A block which has relatively larger wear can be allocated as a write destination block to a write request of data requiring a data retention term of one month.

In the first and second embodiments, from blocks in which the data retention term estimated from wear of each of the blocks is longer than or equal to the specified data retention term, a block having a wear corresponding to a shorter data retention term is preferentially selected as a write destination block. Thus, when data in which the data retention term specified by the host 2 is short is written, a block having a data retention term beyond necessity is not used to write the data. In this way, when data in which the data retention term specified by the host 2 is long is written, it is possible to prevent the shortage of blocks having a wear corresponding to a data retention term longer than or equal to the data retention term specified by the host 2. It is possible to further optimally distribute a plurality of blocks having different wears to a plurality of types of data having different required-data-retention terms.

When the data retention term estimated from the wear of the block selected as a write destination block is longer than the data retention term specified by the host 2, data can be written to the selected block by program operation in a wear reduction mode in which an amount of electrical charge stored in each of memory cells of the selected block is less than that of program operation in a normal program mode. In this manner, it is possible to reduce the wear of each of memory cells and elongate the life of the flash storage device 3 in comparison with a case where program operation is performed in a normal program mode.

According to the first and second embodiments, it is possible to provide a memory system with improved reliability.

In the first and second embodiments, a NAND flash memory is exemplarily shown as a nonvolatile memory. However, the functions of the first and second embodiments may be applied to various other nonvolatile memories such as a magnetoresistive random access memory (MRAM), a phase change random access memory (PRAM), a resistive random access memory (ReRAM) or a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
a nonvolatile memory that includes a plurality of blocks; and
a controller electrically connected to the nonvolatile memory and configured to control the nonvolatile memory, wherein the controller is configured to:

classify the blocks into a plurality of block groups corresponding to a plurality of data retention terms based on wear of each of the blocks, the wear relating to an erase operation for each of the blocks;
receive, from the host, a first write command including a first parameter specifying a first retention term required for first data to be written and a second write command including a second parameter specifying a second retention term required for second data to be written, the second retention term being shorter than the first retention term;
in response to receiving the first write command, select, when a block classified into a first block group having a data retention term which is equal to the first retention term specified by the first parameter in the received first write command is present, the block classified into the first block group as a first block, and select, when no block classified into the first block group is present, a block classified into a second block group having a data retention term longer than the first retention term as the first block;
write the first data to the first block;
in response to receiving the second write command, select, when a block classified into a third block group having a data retention term which is equal to the second retention term specified by the second parameter in the received second write command is present, the block classified into the third block group as a second block, and select, when no block classified into the third block group is present, a block classified into a fourth block group having a data retention term longer than the second retention term as the second block; and
write the second data to the second block.

2. The memory system of claim 1, wherein the wear of each of the blocks is indicated by an erase count of each of the blocks.

3. The memory system of claim 1, wherein the wear of each of the blocks is indicated by an erasing time of each of the blocks.

4. The memory system of claim 1, wherein the controller is further configured to:
write, when the block classified into the first block group is selected as the first block, the first data to the first block by a first program operation; and
write, when the block classified into the second block group is selected as the first block, the first data to the first block by a second program operation in which an amount of electrical charge to be stored in each of memory cells of the first block is less than the first program operation.

5. The memory system of claim 1, wherein
when no block classified into the first block group is present, a block classified into a block group having a data retention term shorter than the first retention term is not selected as the first block, and
when no block classified into the third block group is present, a block classified into a block group having a data retention term shorter than the second retention term is not selected as the second block.

6. The memory system of claim 1, wherein
the plurality of data retention terms correspond to a plurality of levels, and
the controller is further configured to:
when no block classified into the first block group is present, determine whether or not a block classified into a block group having a data retention term longer than the first retention term by one level is present; and when the block classified into the block group having the data retention term longer than the first retention term by one level is present, select, as the first block, the block classified into the block group having the data retention term longer than the first retention term by one level, the second block group being the block group having the data retention term longer than the first retention term by one level.

7. The memory system of claim 6, wherein the controller is further configured to:

when no block classified into to the block group having the data retention term longer than the first retention term by one level is present, determine whether or not a block classified into a block group having a data retention term shorter than a longest retention term of the plurality of data retention terms by one level is present; and when the block classified into the block group having the data retention term shorter than the longest retention term by one level is present, select, as the first block, the block classified into the block group having the data retention term shorter than the longest retention term by one level, the second block group being the block group having the data retention term shorter than the longest retention term by one level.

8. The memory system of claim 7, wherein the controller is further configured to:

when no block classified into the block group having the data retention term shorter than the longest retention term by one level, select, as the first block, a block classified into to a block group having the longest retention term, the second block group being the block group having the longest retention term.

9. The memory system of claim 1, wherein the nonvolatile memory is a NAND flash memory which includes a plurality of memory chips, each chip has a plurality of blocks and each block is respectively erasable.

10. The memory system of claim 1, wherein the nonvolatile memory is a NAND flash memory which includes a plurality of memory chips and the plurality of memory chips are configured to be erasable as a super block.

11. A method for controlling a nonvolatile memory that includes a plurality of blocks, the method comprising:

classifying the blocks into a plurality of block groups corresponding to a plurality of data retention terms based on wear of each of the blocks, the wear relating to an erase operation for each of the blocks;

receiving, from a host, a first write command including a first parameter specifying a first retention term required for first data to be written and a second write command including a second parameter specifying a second retention term required for second data to be written, the second retention term being shorter than the first retention term;

in response to receiving the first write command, selecting, when a block classified into a first block group having a data retention term which is equal to the first retention term specified by the first parameter in the received first write command is present, the block classified into the first block group as a first block, and selecting, when no block classified into the first block group is present, a block classified into a second block group having a data retention term longer than the first retention term as the first block;

writing the first data to the first block;

in response to receiving the second write command, selecting, when a block classified into a third block group having a data retention term which is equal to the second retention term specified by the second parameter in the received second write command is present, the block classified into the third block group as a second block, and selecting, when no block classified into the third block group is present, a block classified into a fourth block group having a data retention term longer than the second retention term as the second block; and writing the second data to the second block.

12. The method of claim 11, wherein the wear of each of the blocks is indicated by an erase count of each of the blocks.

13. The method of claim 11, wherein the wear of each of the blocks is indicated by an erasing time of each of the blocks.

14. The method of claim 11, wherein the writing the first data includes:

writing, when the block classified into the first block group is selected as the first block, the first data to the first block by a first program operation; and writing, when the block classified into the second block group is selected as the first block, the first data to the first block by a second program operation in which an amount of electrical charge to be stored in each of memory cells of the first block is less than the first program operation.

15. The method of claim 11, wherein when no block classified into the first block group is present, a block classified into a block group having a data retention term shorter than the first retention term is not selected as the first block, and when no block classified into the third block group is present, a block classified into a block group having a data retention term shorter than the second retention term is not selected as the second block.

16. The method of claim 11, wherein the plurality of data retention terms correspond to a plurality of levels, and the method further comprises:

when no block classified into the first block group is present, determining whether or not a block classified into a block group having a data retention term longer than the first retention term by one level is present; and when the block classified into the block group having the data retention term longer than the first retention term by one level is present, selecting, as the first block, the block classified into the block group having the data retention term longer than the first retention term by one level, the second block group being the block group having the data retention term longer than the first retention term by one level.

17. The method of claim 16, further comprising:

when no block classified into to the block group having the data retention term longer than the first retention term by one level is present, determining whether or not a block classified into a block group having a data retention term shorter than a longest retention term of the plurality of data retention terms by one level is present; and when the block classified into the block group having the data retention term shorter than the longest retenterm by one level is present, selecting, as the first block, the block classified into the block group having the data retention term shorter than the longest retention term by one level, the second block group being the block group having the data retention term shorter than the longest retention term by one level.

18. The method of claim 17, further comprising:
when no block classified into to the block group having the data retention term shorter than the longest retention term by one level, select, as the first block, a block classified into to a block group having the longest retention term, the second block group being the block group having the longest retention term.

19. The method of claim 11, wherein
the nonvolatile memory is a NAND flash memory which includes a plurality of memory chips, each chip has a plurality of blocks and each block is respectively erasable.

20. The method of claim 11, wherein
the nonvolatile memory is a NAND flash memory which includes a plurality of memory chips and the plurality of memory chips are configured to be erasable as a super block.

* * * * *